(12) United States Patent
Newbury et al.

(10) Patent No.: US 9,557,219 B2
(45) Date of Patent: Jan. 31, 2017

(54) COMB-BASED SPECTROSCOPY WITH SYNCHRONOUS SAMPLING FOR REAL-TIME AVERAGING

(71) Applicant: The National Institute of Standards and Technology, The United States of America, as Represented by the Secretary of Commerce, Washington, DC (US)

(72) Inventors: Nathan R. Newbury, Boulder, CO (US); Ian Coddington, Boulder, CO (US); William C. Swann, Boulder, CO (US)

(73) Assignee: The United States of America, as represented by the Secretary of Commerce, National Institute of Standards and Technology, Gaithersbury, MD (US)

( * ) Notice: Subject to any disclaimer, the term of this patent is extended or adjusted under 35 U.S.C. 154(b) by 461 days.

(21) Appl. No.: 14/012,436

(22) Filed: Aug. 28, 2013

(65) Prior Publication Data

US 2013/0342836 A1 Dec. 26, 2013

Related U.S. Application Data

(62) Division of application No. 12/883,455, filed on Sep. 16, 2010, now Pat. No. 8,564,785.

(60) Provisional application No. 61/243,554, filed on Sep. 18, 2009.

(51) Int. Cl.
*G01J 3/453* (2006.01)

(52) U.S. Cl.
CPC .................................. *G01J 3/453* (2013.01)

(58) Field of Classification Search
CPC ............................. G01J 3/453; G01J 3/4338
See application file for complete search history.

(56) References Cited

U.S. PATENT DOCUMENTS

| | | |
|---|---|---|
| 4,297,035 A | 10/1981 | Bjorklund |
| 5,177,633 A | 1/1993 | Wong |
| 5,233,462 A | 8/1993 | Wong |
| 5,748,309 A | 5/1998 | van der Weide et al. |
| 6,178,036 B1 | 1/2001 | Yao |
| 6,535,328 B2 | 3/2003 | Yao |
| 6,570,893 B1 | 5/2003 | Libatique et al. |
| 6,611,546 B1 | 8/2003 | Garnache et al. |
| 6,711,203 B1 | 3/2004 | Garnache et al. |
| 6,724,788 B1 | 4/2004 | Holzwarth et al. |
| 6,741,629 B1 | 5/2004 | Garnache et al. |
| 6,777,244 B2 | 8/2004 | Pepper et al. |

(Continued)

OTHER PUBLICATIONS

I. Coddington, W.C. Swann, N.R. Newbury, "Measuring optical waveforms with fiber frequency combs", IEEE LEOS Summer Topical Meeting, Optical Frequency & Time Measurement and Generation, Winter Topicals, Innsbruck, Australia Jan. 11, 2009 to Jan. 14, 2009.

(Continued)

*Primary Examiner* — Vuthe Siek
*Assistant Examiner* — Aric Lin
(74) *Attorney, Agent, or Firm* — Carlson, Gaskey & Olds, P.C.

(57) ABSTRACT

A method of comb-based spectroscopy for measuring a CW source at time-bandwidth limited resolution by using frequency combs with a high degree of mutual coherence (<1 radian phase noise).

6 Claims, 16 Drawing Sheets

(56) References Cited

U.S. PATENT DOCUMENTS

| | | | |
|---|---|---|---|
| 6,785,303 | B1 | 8/2004 | Holzwarth et al. |
| 6,798,796 | B2 | 9/2004 | Hiroshi et al. |
| 6,813,050 | B2 | 11/2004 | Chen et al. |
| 6,850,543 | B2 | 2/2005 | Cundiff et al. |
| 6,897,959 | B2 | 5/2005 | Haensch et al. |
| 7,088,876 | B2 | 8/2006 | Haensch et al. |
| 7,187,864 | B2 | 3/2007 | Haensch et al. |
| 7,203,402 | B2 | 4/2007 | Haensch et al. |
| 7,259,856 | B2 | 8/2007 | Kachanov et al. |
| 7,291,839 | B1 | 11/2007 | Demers et al. |
| 7,298,489 | B2 * | 11/2007 | Dorrer .................. G01J 11/00 356/450 |
| 7,483,143 | B2 | 1/2009 | Sanders et al. |
| 7,538,881 | B2 | 5/2009 | Ye et al. |
| 7,664,149 | B2 | 2/2010 | Diels et al. |
| 7,672,342 | B2 | 3/2010 | Gohle et al. |
| 2011/0043815 | A1 | 2/2011 | Giaccari et al. |
| 2011/0267625 | A1 * | 11/2011 | Guelachvili .......... G01J 3/453 356/454 |

OTHER PUBLICATIONS

I. Coddington, W.C. Swann, N.R. Newbury, "Coherent linear optical sampling at over 15 bits" Optics Letters, submitted.

Coddington, I., Sawnn, W.C., Nenadovic, L, & Newbury, N.R. (2009) Rapid and precise absolute distance measurements at long range. May 24, 2009.

I. Coddington, N.R. Newbury, W.C. Swann, "Frequency Comb Spectroscopy with coherent optical sampling" Fourier Transform Spectrosocpy (FTS), Vancouver, CA Apr. 26, 2009 to Apr. 30, 2009.

N.R. Newbury, I. Coddington, T. Dennis, W.C. Swann, P.A. Williams, "Coherent measurements with fiber-laser frequency combs", Advanced Solid-State Photonics Topical Meeting, Denver, CO, United States, Feb. 2, 2009 to Feb. 4, 2009.

N.R. Newbury, I. Coddington, W.C. Swann, "Applications of highly coherent femtosecond fiber lasers" Coherent Optical Technologies and Applications (COTA), Boston, MA, United States, Jun. 8, 2008 to Jun. 13, 2008, 2 pp.

I. Coddington, W.C. Swann, N.R. Newbury, "High resolution spectroscopy using fiber-laser frequency combs" Tech. Dig. Conf on Prec. Electromagn. Meas., Broomfield, CO, United States, Jun. 8, 2008 to Jun. 13, 2008, 2 pp.

I. Coddington, W.C. Swann, N.R. Newbury, "Broadband frequency comb spectroscopy" Tech. Dig. Conf. on Lasers and Electro-Optics (CLEO), annual Conference on Laswers and Electro-Optics (CLEO) and the Quantum Electronics and Laser Science Conference (QELS), San Jose, CA, United States, May 4, 2008 to May 9, 2008, 2 pp.

Coddington, I., Sawnn, W.C., & Newbury, N.R. (2009). Coherent linear optical sampling at 15 bits of resolution. Optics Letters, 34(14), 2153-2155. Jul. 15, 2009.

Schliesser, A. (2005). Frequency-comb infrared spectrometer for rapid, remote chemical sensing. Optics Express. 13(22). Oct. 31, 2005.

F. Keilmann, C. Gohle, and R. Holzwarth, "Time-domain and mid-infrared frequency-comb spectrometer" Opt. Lett. 29, 1542-1544 (2004).

S. Schiller, "Spectrometry with frequency combs", Opt. Lett. 27, 766-768 (2002).

C. Dorrer, "Complete characterization of periodic optical sources by use of sampled test-plus-reference interferometry", Opt. Lett. 30, 2022-2024 (2005).

M.J. Thorpe, K.D. Moll, R.J. Jones, B. Safdi and J. Ye, "Broadband cavity ringdown spectroscopy for sensitive and rapid molecular detection", Science 311, 1595-1599 (2006).

Mandon, J. et al. (2009). Fourtier transform spectroscopy with a laser frequency comb. Nature Photonics, vol. 3, Jan. 25, 2009.

* cited by examiner

COMB-BASED SPECTROSCOPY WITH SYNCHRONOUS SAMPLING FOR REAL-TIME AVERAGING

CROSS-REFERENCE TO RELATED APPLICATIONS

This application is a Divisional of U.S. patent application Ser. No. 12/883,455, filed Sep. 16, 2010, now U.S. Pat. No. 8,564,785, which claims priority to United States Provisional Patent Application No. 61/243,554, filed Sep. 18, 2009.

BACKGROUND

The present disclosure relates to a comb-based spectroscopy.

Fourier transform spectroscopy (FTS or FTIR) has long been a workhorse system for research and industry. Recent advances in spectroscopy using dual frequency combs offer an interesting new approach to FTS. Frequency combs are stabilized pulsed lasers that produce a comb of well-defined frequency lines (hence the name frequency comb) in the frequency domain, equivalent to many CW lasers. They can also be considered in the time domain where they emit a train of optical pulses with a well-defined carrier frequency and repetition rate. Frequency comb sources are attractive for spectroscopy since they can be used, in principle, to combine the benefits of heterodyne laser spectroscopy with broad spectral coverage for high resolution, broadband measurements of samples. In a dual-comb spectroscopy approach, one comb probes a sample and a second comb acts as a local oscillator to read out the response. This dual-comb spectroscopy approach can be viewed as a form of infrared time-domain spectroscopy (TDS) analogous to THz TDS, or as a massively parallel multi-heterodyne laser spectrometer. It can be used to perform spectroscopy on a passive sample or on an active CW source.

SUMMARY

A method, according to an exemplary embodiment, of comb-based spectroscopy for measuring a CW source at time-bandwidth limited resolution by using frequency combs with a high degree of mutual coherence (<1 radian phase noise), includes generating a first comb that transmits a first pulse train that is optically combined with a CW source; detecting the overlap of each pulse of the first comb with the CW source in a first photodetector; digitizing a photodetector response from the first photodetector for each pulse of the first pulse train; generating a second comb that is optically coherent with the first comb, said second comb transmits a second pulse train that has a pulse period that differs by $\Delta T$ and a pulse repetition frequency that differs by $\Delta fr$ from the first pulse train, and is separately combined with the CW source; detecting the overlap of each pulse of the second comb with the CW source in a second photodetector; digitizing a photodetector response from the second photodetector for each pulse of the second pulse train; multiplying the digitized samples from the first comb times the digitized samples of the second comb over a time ($1/\Delta fr$) to generate a data point record of length ($fr/\Delta fr$) where fr is the repetition rate; rescaling the point separation for the data record there between to be $\Delta T$; and Fourier transforming the product of the digitized samples to yield a wideband spectrum of the CW source at a resolution given by the comb repetition rate and an ambiguity given by $1/(2\Delta T)$ to provide an absolute frequency of the CW source with respect to a CW reference laser to which the respective first comb and the second are locked.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

Figure 1A:
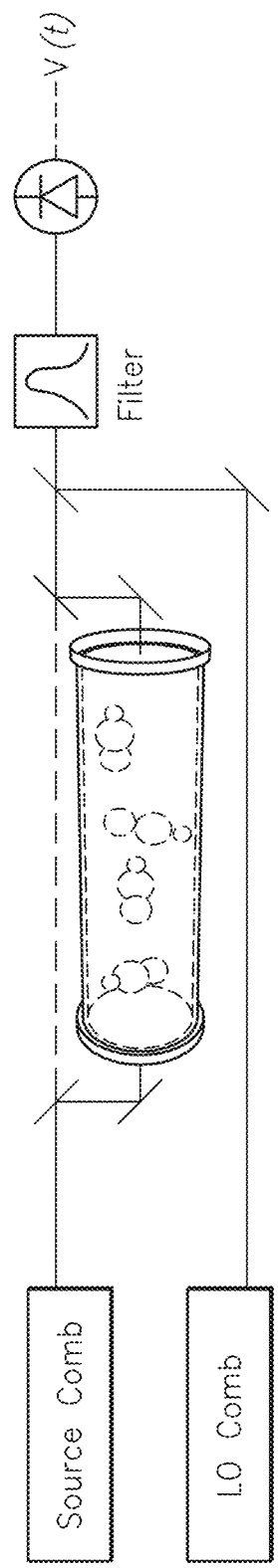
FIG. 1A is a simplified picture of a dual-comb spectrometer of spectroscopy of a sample. The pulse train from a source comb passes through the sample (and is possibly split as well to pass around the sample to yield a time-multiplexed normalization signal), then combined with a Local Oscillator (LO) pulse train. Depending on the configuration, a tunable bandpass filter is employed to satisfy Nyquist conditions. The heterodyne signal between the source and LO is detected and digitized to yield the complex gas sample response. In this configuration where the LO bypasses the sample, both the phase and magnitude of the sample response are measured.
Figure 1C:
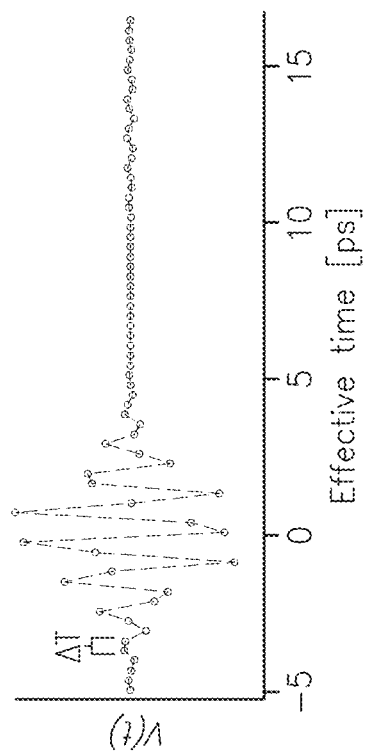
FIG. 1C is a representation of actual digitized data of the photodetector voltage corresponding to the overlap of the source and LO pulses. Each data point corresponds to the product of the source and LO pulses, integrated over the pulse duration. The detected signal is plotted verses effective time by assigning the data point spacing to be exactly $\Delta T$. Note that the data is equivalent to an interferogram, or cross-correlation, formed as pulses from the source and LO pass through each other. The large "centerburst" ranging from −3 ps to +3 ps corresponds to the overlap of the LO and source pulses. Also visible at 14 ps is a weak ringing containing absorption information from an HCN gas sample.
Figure 1B:
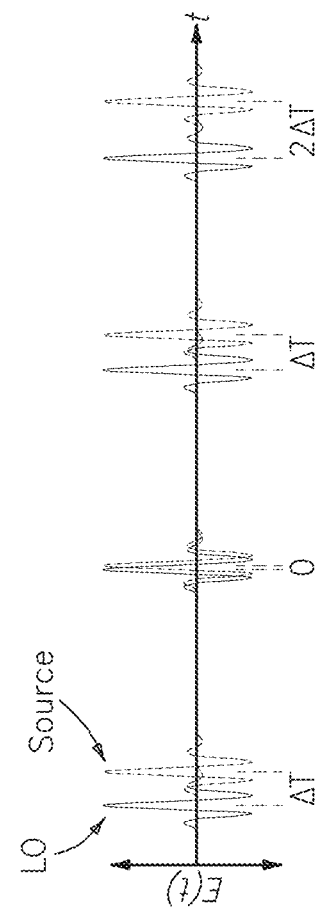
FIG. 1B is a time-domain description of the coherent dual-comb spectrometer in which the source and LO emit pulse trains in time. Since they have different repetition rates, the relative source and LO pulse timing increments by $\Delta T = \Delta f_r/(f_{r,S} \times f_{r,LO})$ with each sequential pulse, where $f_{r,S}$ is the source comb repetition rate, $f_{r,LO}$ is the LO comb repetition rate, and $\Delta f_r = f_{r,S} - f_{r,LO}$ is their difference.
Figure 1D:
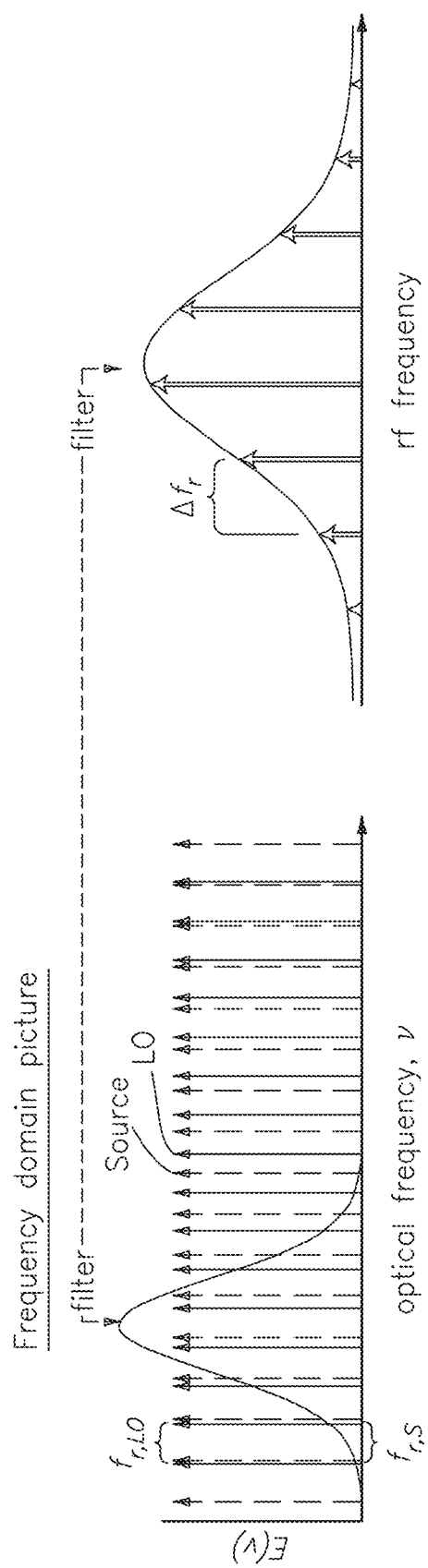
FIG. 1D is an equivalent frequency domain description of the coherent dual-comb spectrometer. In the frequency domain each comb creates an array of discrete teeth with slightly different spacings (repetition rates).
Figure 2A:
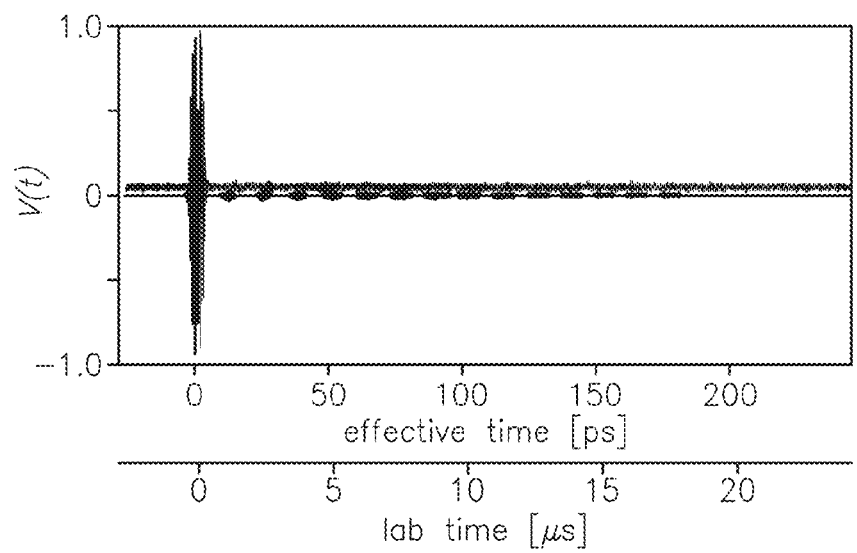
Figure 2B:
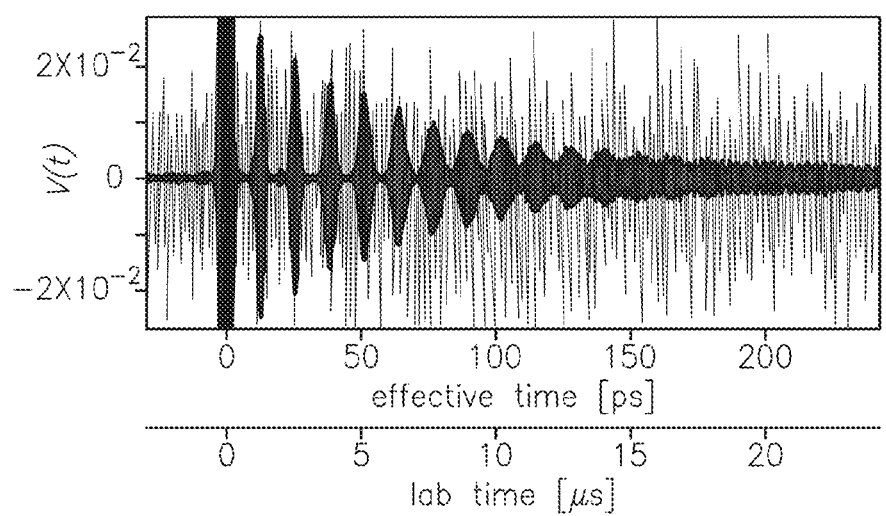
Figure 2C:
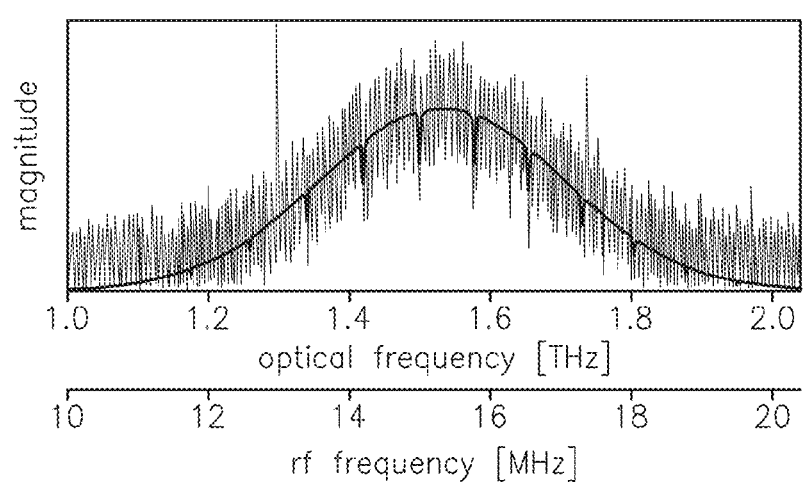

The right side of FIG. 1D represents the rf signature created by the two combs, each having slightly different repetition rates (tooth spacing), beating together to yield a third comb in the rf with spacing $\Delta f_r = f_{r,S} - f_{r,LO}$. This rf comb is related to FIG. 1C simply by a Fourier transform a concatenated series of such interferograms and rescaling of the frequency axis. Note that for our experimental conditions the rf comb in would contain ~4000 teeth;

FIG. 2A are example data traces illustrating the basic time domain signal and the ability of coherent signal averaging to improve signal-to-noise ratio (SNR). Here, the measured time-domain data (interferograms) are for a sample of 25 Torr of hydrogen cyanide (HCN) gas around 1539 nm with a spectral bandwidth set by the tunable filter (filter used here is 350 GHz). For these data $\Delta f_r = 1$ kHz, a single interferogram is acquired in a laboratory time of 1 ms (only the central ~8 μs is shown here). The time axis is also given in effective time, defined by the pulse-to-pulse time offset, $\Delta T$, between the signal and LO pulses. The strong signal at zero time, which has been normalized to unity, corresponds to the overlap of the LO and unperturbed source pulse. The effect of the gas is to generate a free-induction decay signal that extends to longer times. For the single trace (upper, light), this FID tail is barely above the noise level. However, the coherently averaged interferogram (dark, offset for clarity-1000 averages shown) has greatly improved SNR;

FIG. 2B is the same data as in FIG. 2A with the vertical axis expanded 25 times. The averaged data clearly resolves the free induction decay (FID) signal. This FID of the molecules appears as a pulses due to the "rotational recurrences", "rotational revivals", or "commensurate echoes" as the rotating molecules rephrase;

FIG. 2C is a complex frequency-domain response generated by a Fourier transform of the averaged trace. Spectral response (magnitude only) is plotted here for a single trace (light) and 1000 averages (dark). The rf frequency axis corresponds to the lab time axis and represents the actual frequency of the digitized signal. The optical frequency axis corresponds to the effective time axis and shows the actual optical frequency relative to the 1560 nm CW reference laser discussed later.

Figure 3A:
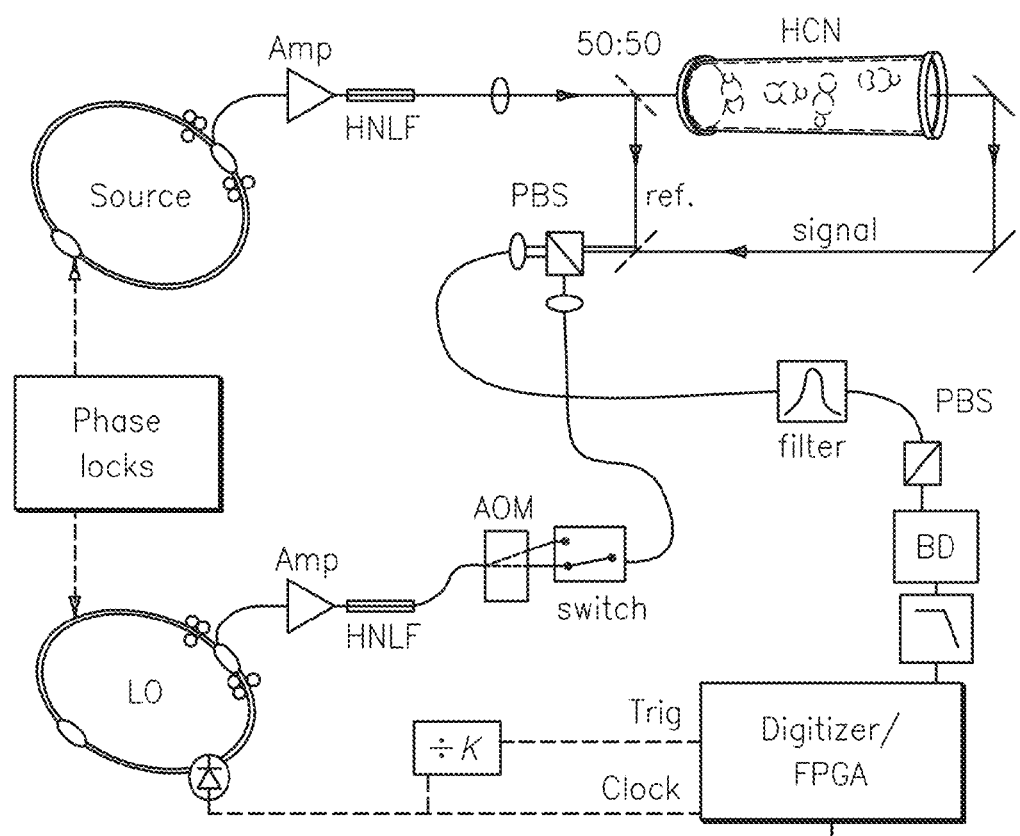

FIG. 3A is an experimental setup for spectroscopy of a sample with two femtosecond erbium-doped fiber lasers phase-locked together with a well-defined difference in repetition rates and phase-coherent optical carriers. Pulses from the source laser (or frequency comb) are coupled into a free space section where a beamsplitter divides the source pulse into a signal pulse that passes through a cell containing $H^{13}C^{14}N$ gas and a reference pulse that circumvents it. Because of the different path length travelled by the signal and reference pulses, there is a beneficial 2.6 ns time separation between them. The signal and reference pulses are then recombined with each other, and then with the LO pulse train from the LO frequency comb on a polarizing beam splitter (PBS). The combined pulses are coupled back into a single-mode fiber optic, filtered by a scanning bandpass optical filter and detected on a balanced detector (BD). The additional AOM and switch in the LO path are used to select the offset frequency of the LO such that the detected rf multi-heterodyne signal between the LO and source combs does not fall at baseband or Nyquist.

Figure 3B:
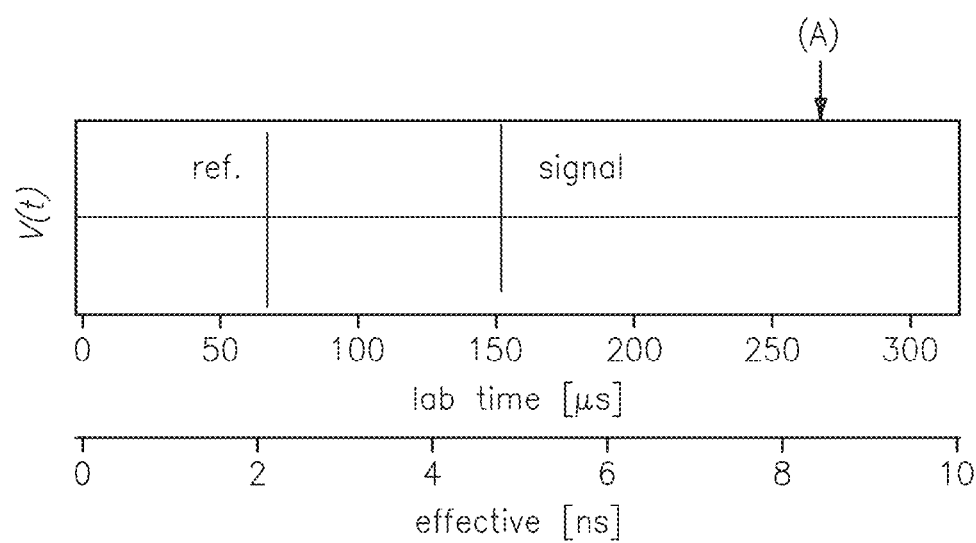

FIG. 3B is a detected voltage signal, with the peak normalized to one, corresponding to the overlap of the LO pulse with either the reference or signal pulse. Voltages are digitized synchronously with the LO pulses. The reference pulse arrives 2.6 ns sooner than the signal pulse and the separate arrival of the two is seen in the two separate peaks in the detected voltage. Note that the two peaks are easily distinguished from one another. In the terminology of conventional FTS, these two peaks correspond to two separate centerbursts in the interferogram. The time axis is given in both laboratory time and effective time for a $\Delta f_r=3.14$ kHz. The 320 microseconds duration in laboratory time corresponds to the time to acquire the $N_1\sim32{,}000$ LO pulses, spaced by ~10 nsec. The ~10 nsec duration in effective time corresponds to the same $N_1\sim32{,}000$ LO pulses with a point spacing set to equal the $\Delta T\sim300$ fsec time offset between the LO and source pulses. The data trace shown corresponds to actual data, averaged over $10^4$ individual traces using coherent real-time averaging.

Figure 4A:
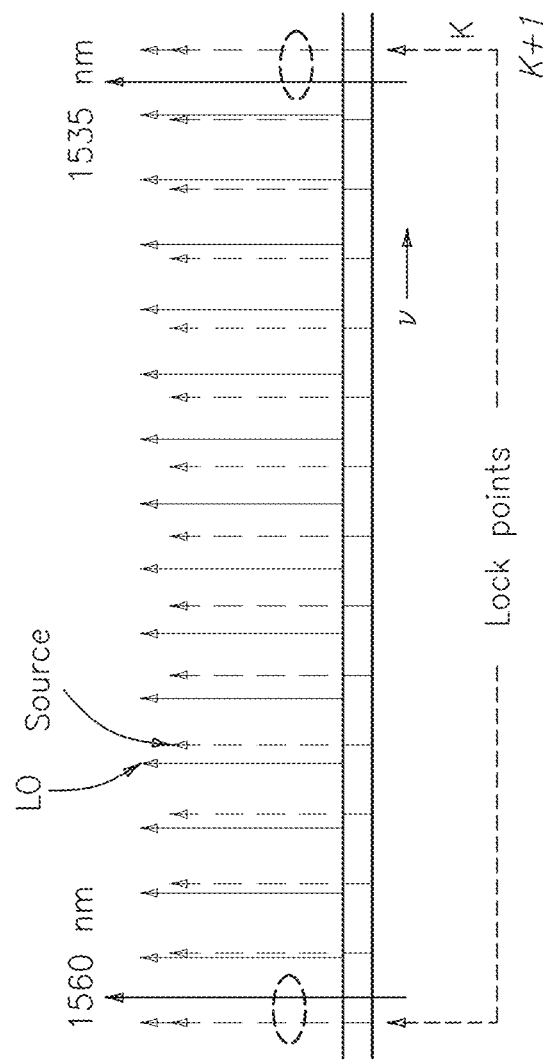

FIG. 4A is a setup used to stabilize the two frequency combs such that they are both phase-coherent with sub-Hertz residual linewidths and with a very well-defined difference in repetition rates, $\Delta f_r$. The locking setup is most easily illustrated in the frequency domain picture. A pair of teeth from each comb is stabilized to a pair of CW reference lasers. The phase-locks use identical rf offsets for both combs. Repetition rates are chosen here such that there are exactly $N_1$ LO comb teeth between the two points and $N_2=N_1-1$ for the source comb. As a consequence, in the time domain, the interferograms repeat precisely every $N_1-1$ LO pulses.

Figure 4B:
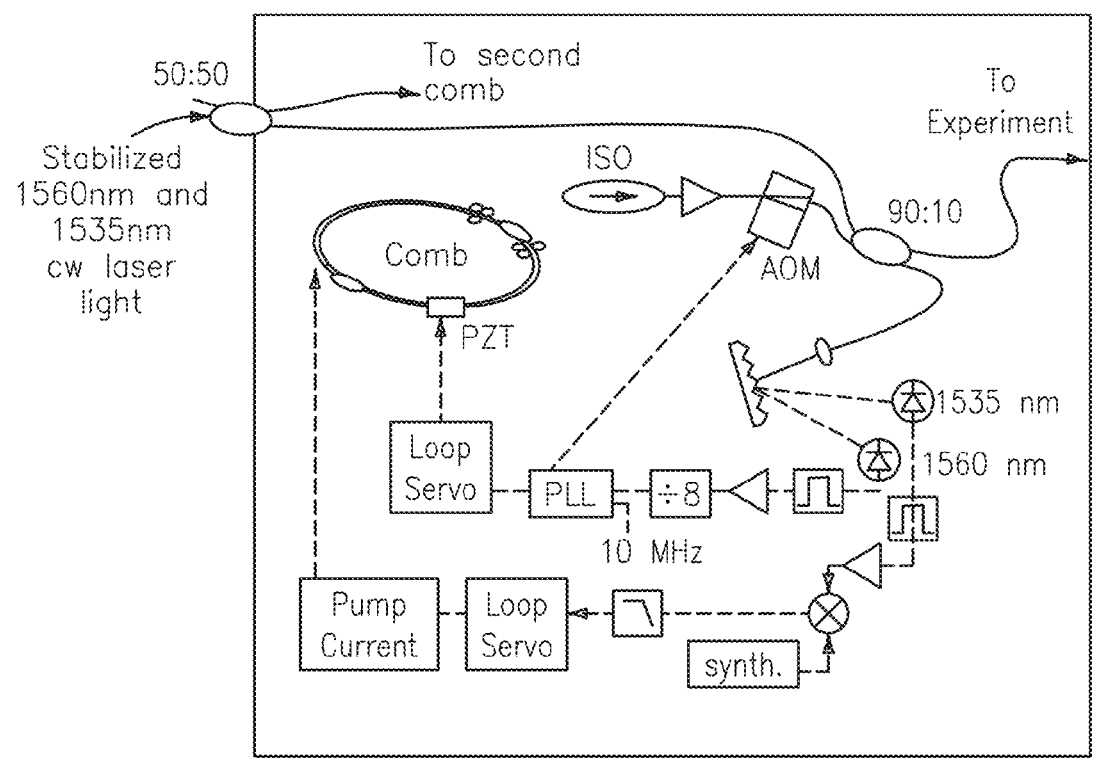

FIG. 4B is a setup used to phase-lock a single comb to the two CW reference lasers. The two CW lasers are phase-locked to a high finesse optical cavity using a Pound Dreyer Hall lock. The stabilized light from the 1560 nm and 1535 nm lasers is combined on a fiber and enters on the left hand side of the figure as shown. PLL-Phase lock loop, ISO-optical isolator, PZT-piezoelectric transducer.

Figure 5A:
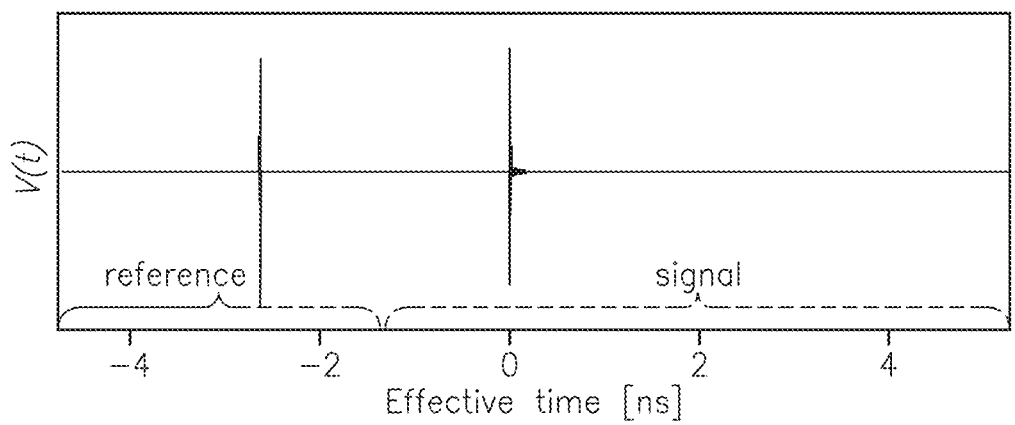

FIG. 5A is Data processing for the signal from a 15 cm long cell filled with 25 Torr of $H^{13}C^{14}N$ gas in which the Time domain interferogram signal after 10,000 averages. The trace is divided into reference and signal portions as shown. The reference corresponds to the cross-correlation of the LO pulses with the source pulse that circumvented the sample while the signal corresponds to the source pulses that passed through the sample. (See FIG. 3A).

Figure 5B:
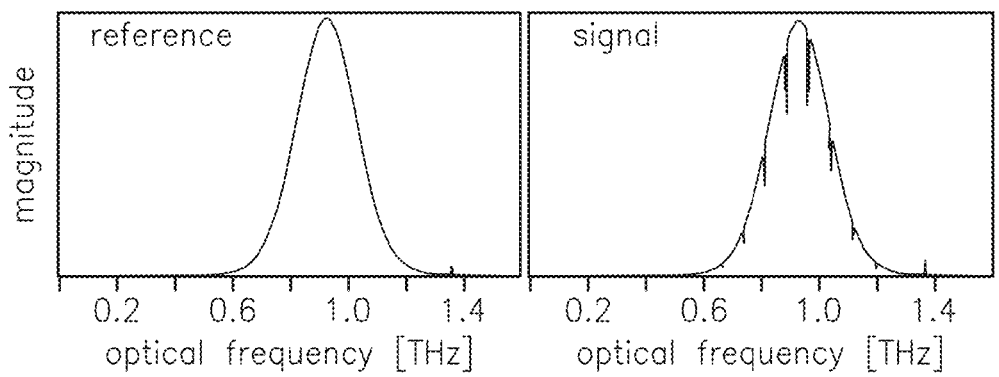

FIG. 5B is a Fourier transform of reference, $\tilde{V}_R(v_k)$, and signal, $\tilde{V}_S(v_k)$, sub-traces (magnitude only, phase not shown). The signal shows the absorption of about 6 ro-vibrational HCN lines.

Figure 5C:
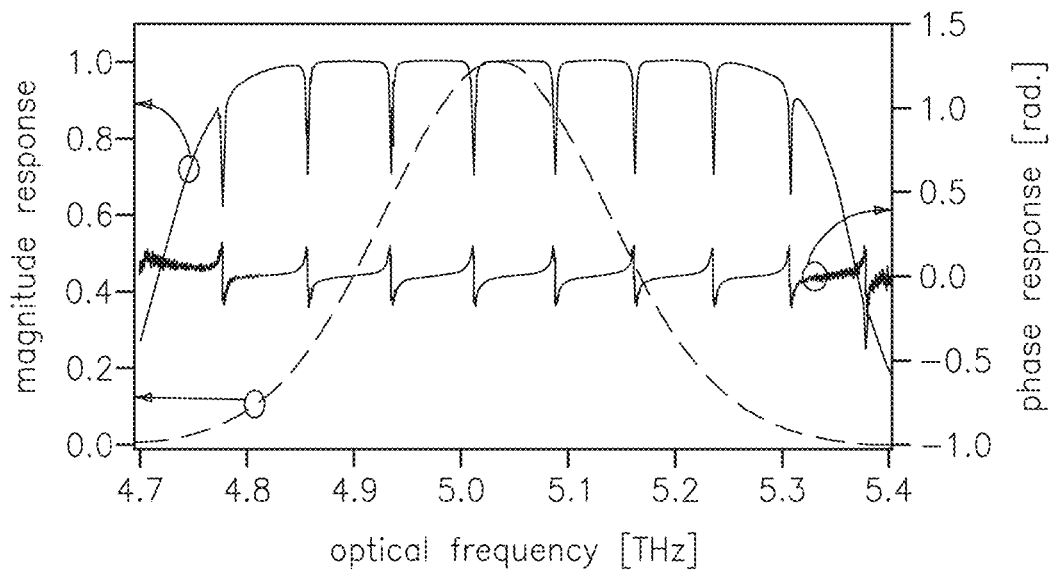
Figure 6A:
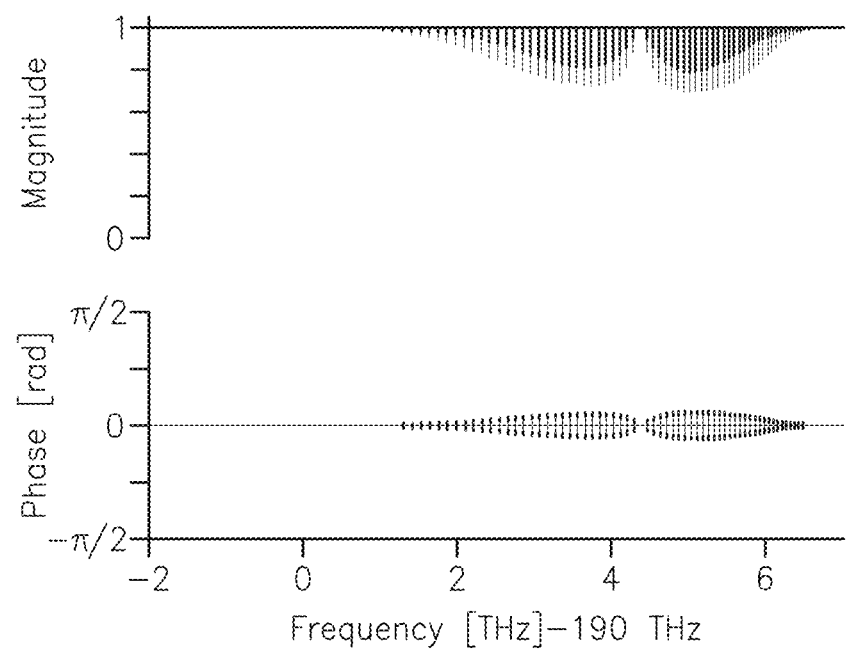
Figure 6B:
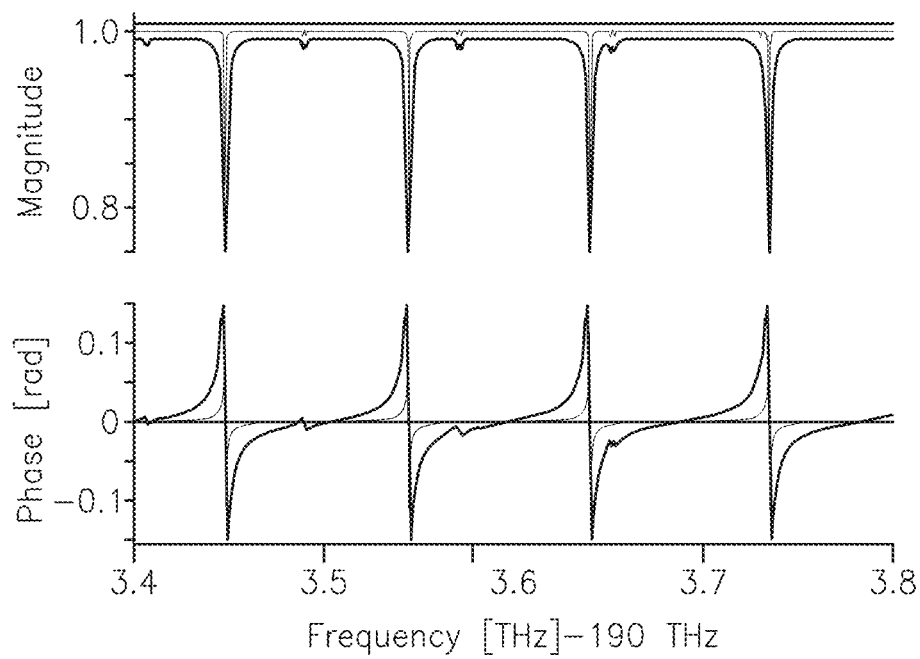

FIG. 5C is a normalized response, $\tilde{H}(v_k)$, in magnitude (dark) and phase (light) calculated from the ratio of the complex, frequency-domain signal and reference of FIG. 6b after shifting the frequency axis by the offset frequency, $v_0$. Dotted line shows the reference trace with the same offset. A spurious peak at 5.29 THz due to rf pick up is visible here but removed from the final data. When response traces are concatenated to cover the full comb spectral width, only the data within the filter FWHM are used.

FIG. 6A is the measured complex spectral response, $\tilde{H}(v)$, of the ro-vibrational lines corresponding to the first overtone H-C stretch vibration in HCN over a 9 THz bandwidth at 220 MHz resolution. The "p-branch" and "r-branch" are clearly visible. For each isolated ro-vibrational line, the magnitude corresponds to the standard gas absorption profile (divided by two since absorption is typically given for intensity) and the phase corresponds to the delay of the light due to the change in the index of refraction. Three different HCN gas pressures are shown: 25-Torr in a 15-cm long cell (light), 2.7-Torr in a 20-cm long cell (dark), and an empty cell. Each trace is generated by concatenating the complex frequency response (e.g. FIG. 5C) measured at forty five different settings of the tunable 2 nm-wide optical bandpass filter.

FIG. 6B is an expanded view of the complex HCN spectrum. For the magnitude data, the three traces have been offset for clarity. For the higher-pressure cell (25 Torr), the magnitude has the Lorentzian profile expected from collisional line broadening with a corresponding "derivative"-like shape for the phase profile. For the lower-pressure cell (2.7 Torr), the magnitude has a Gaussian profile expected from Doppler line broadening, again with corresponding "derivative"-like shape for the phase profile. The molecular hot bands can clearly be seen as much smaller magnitude and phase excursions. The combined benefits of extended averaging and normalization by the reference channel can be seen in the flatness of the baseline. The statistical noise averaged over the full spectrum is ~0.04% in magnitude and 400 μrad in phase. Over the central portion of the spectrum, it drops to ~0.025% in magnitude and 250 μrad in phase. These data were acquired with 60 seconds of averaging at each of the forty five positions of the tunable optical filter giving a total acquisition time of 2700 sec. Of course, the SNR scales with the square root of time so that a 270 sec total acquisition time reduces the SNR in magnitude and phase by a factor of only ~3.3.

Figure 7A:
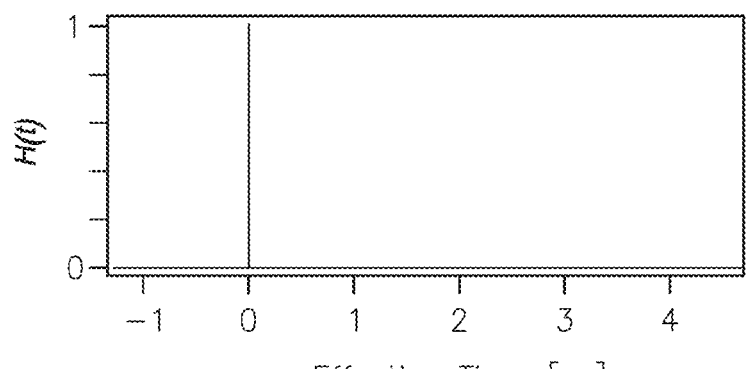

FIG. 7A is the reconstructed time-domain response and joint time-frequency domain response of HCN gas corresponding to the complex frequency response of FIG. 6. This different, but equivalent, view of the data allows for a different physical picture of the gas response as discussed in the text. FIG. 7A is the total time-domain response over a 6 ns window at 55 fs point spacing (9 THz bandwidth) with the peak at t=0 normalized to unity. The time-domain SNR is $0.55 \times 10^6$.

Figure 7B:
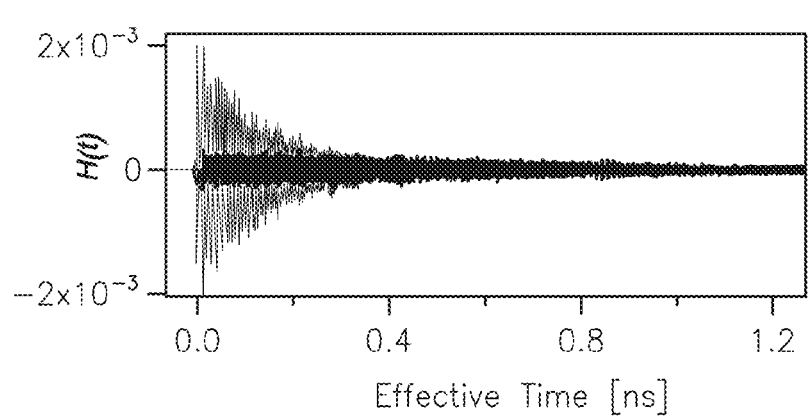

FIG. 7B is the expanded view of the time-domain response for the 2.7-Torr cell (dark), 25-Torr cell (light) and empty cell (gray). While the empty cell trace is flat, the filled cells clearly show a tail from the FID of the excited HCN molecules. For the lower pressure, 2.7-Torr cell, 170 rotational recurrences are visible out beyond 1.8 ns. Because of causality, the FID appears only at positive times (where t=0 corresponds to the arrival of the unperturbed excitation pulse). This single-sided interferogram is a direct consequence of the fact that the LO pulse train passes around rather than through the HCN sample. The envelope of the overall FID signature decays more slowly for the lower pressure cell because of the much lower collisional decoherence rate.

Figure 7C:
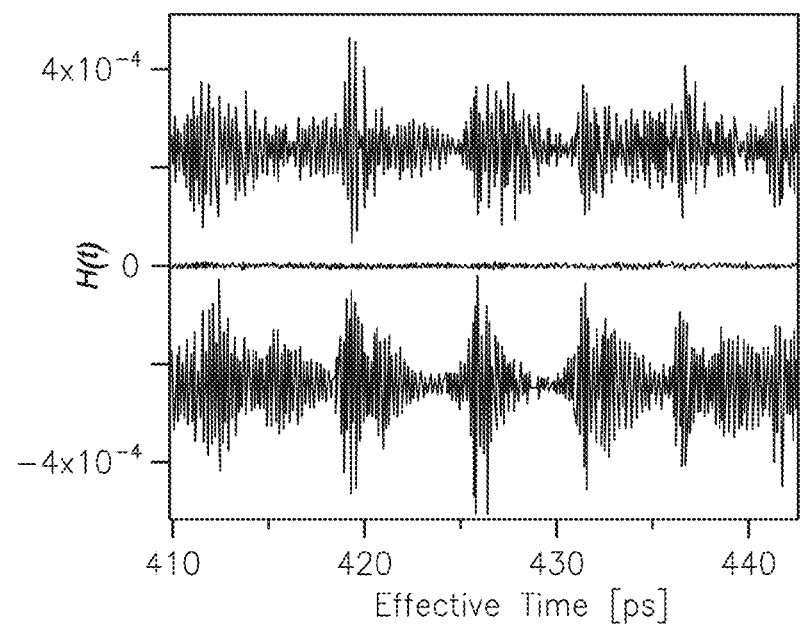

FIG. 7C is a further expanded view where the 25-Torr and 2.7-Torr cell data are offset for clarity. The low noise level can be seen in the middle empty cell trace (gray). The complicated time-domain structure is a result of interferences between the different ro-vibrational levels.

Figure 7D:
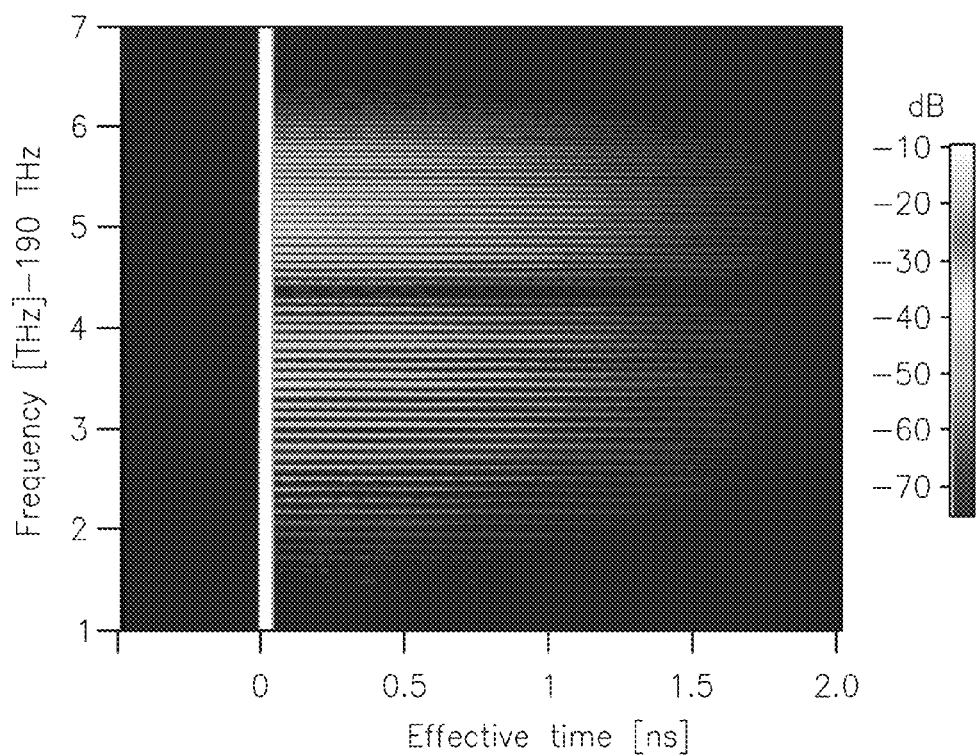

FIG. 7D is a Sonogram (short-time Fourier transform) of the 2.7 Torr data processed with 19 GHz frequency resolution and 52 ps time resolution. The bright vertical stripe at t=0 corresponds to the arrival of the signal pulse and has been normalized to 0 dB. At this frequency resolution the trailing decay signal from each absorption line is clearly visible. At 2.7 Torr, decay is driven primarily by Doppler dephasing, allowing for relatively long decay times.

Figure 7E:
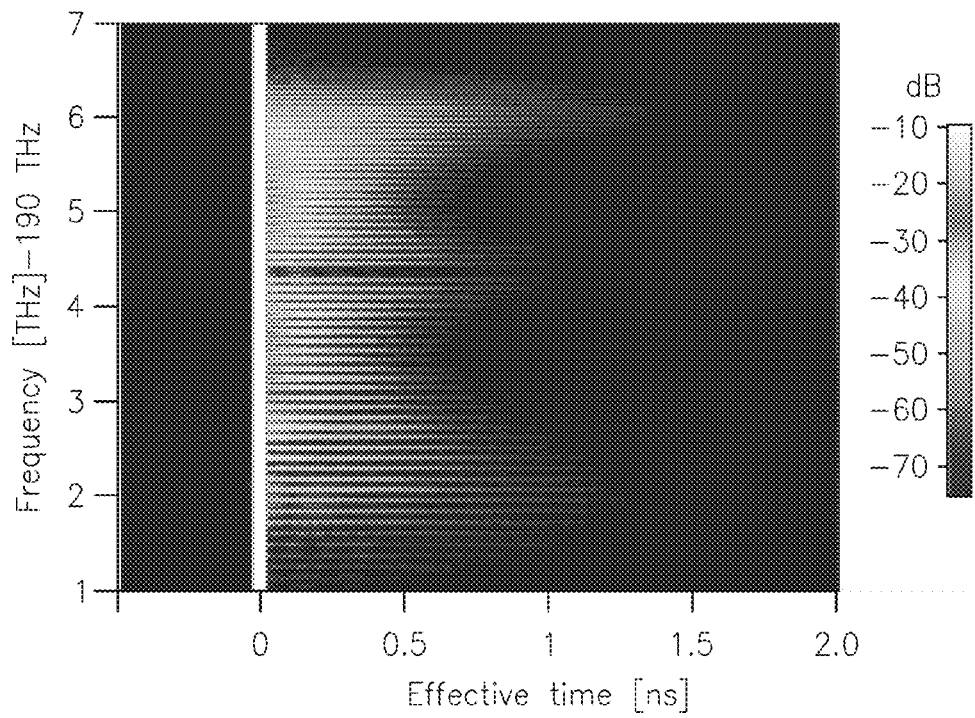

FIG. 7E is a Sonogram under identical conditions as FIG. 7D but for the 25 Torr data. At this pressure collisions accelerate the decay time and collisional resonance between like states is evident in the thermal distribution appearance to the decay times.

Figure 8A:
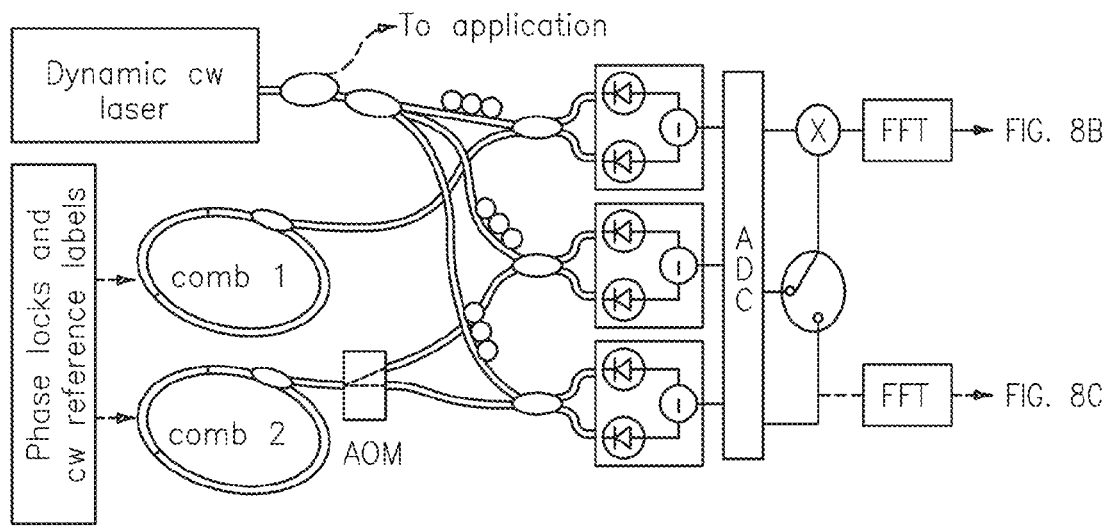

FIG. 8A is the Coherent dual-comb spectrometer reconfigured from FIG. 3A to instead perform spectroscopy on arbitrary CW waveforms, in other words to measure the spectrum of the CW waveform versus time. As before, the two combs are femtosecond Er-fiber lasers optically phase-locked together with repetition rates, $f_r \approx 100$ MHz differing by $\Delta f_r$. A frequency-shifted duplicate of comb 2 is generated with an acousto-optic modulator (AOM). The comb sources output a set of coherent pulses that serve to down-sample the CW laser's E-field. The resulting voltages are digitized synchronously with comb 1, recorded and processed. For spectroscopy of a sample, we referred to the two combs as a source and LO comb. Here the combs both act on equal footing to sample the CW laser field and we refer to them as comb 1 and comb 2. The system is clocked synchronously with comb 1.

Figure 8B:
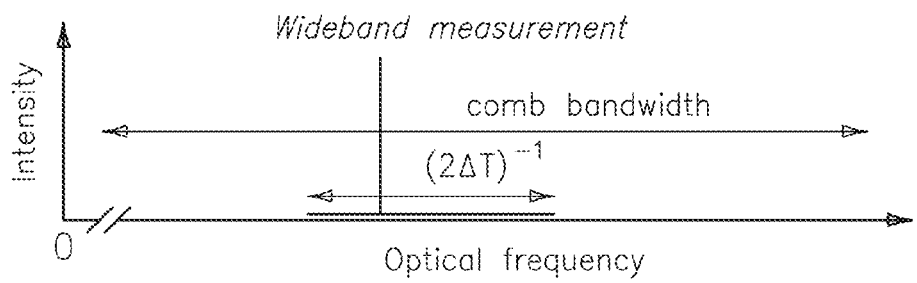

FIG. 8B is the wideband spectrum calculated from the product of both sampled voltages, as discussed below, to provide the absolute frequency calibration with a time resolution $\Delta f_r^{-1} = T_W$ (320 µs and 30 µs).

Figure 8C:
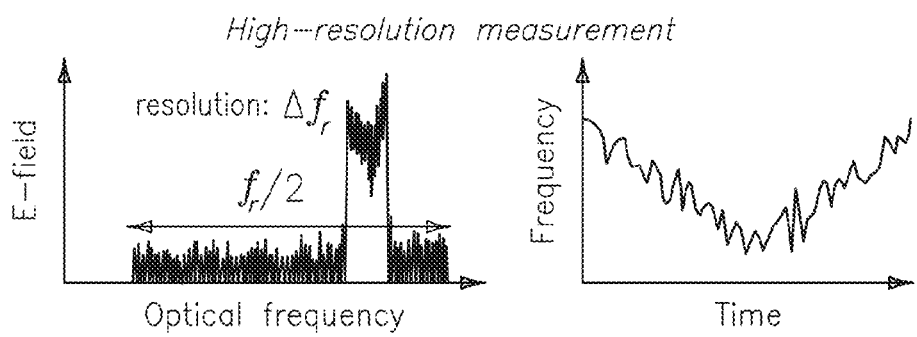

FIG. 8C is a High-resolution measurement of the instantaneous laser frequency (right) and corresponding high-resolution spectrum (left). Measurements at multiple contiguous or spaced time intervals $T_W$ can be concatenated to monitor the laser frequency output over long times.

Figure 9C:
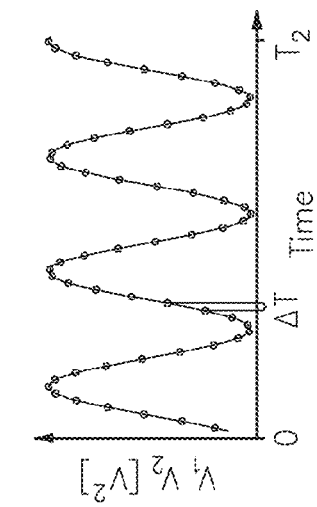
Figure 9B:
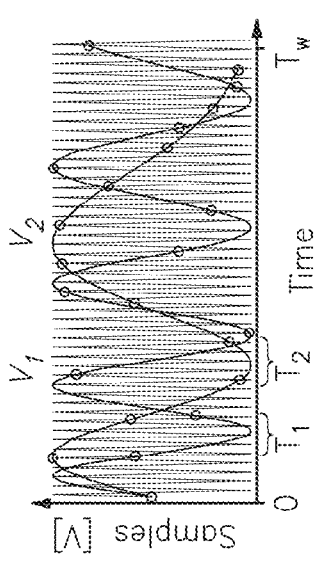
Figure 9A:
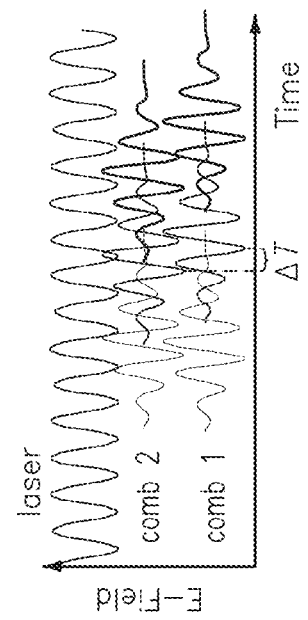

FIG. 9A illustrates the sampling of the CW laser E-field by pulses from the Combs 1 and 2. The pulses arrive at intervals of $T_1 = f_{r1}^{-1}$ and $T_2 f_{r2}^{-1}$, that differ by $\Delta T = T_1 - T_2$. (Not to scale).

FIG. 9B is the real part of the sampled voltages $V_1$ and $V_2$ of the laser E-field by comb 1 and comb 2 for zero ceo phase.

FIG. 9C is the real part of the complex product $V_1 V_2^*$ rescaled to a point spacing equaling $\Delta T$ to correspond to the incremental time delay between the sample pairs $V_1$ and $V_2$.

Figure 9F:
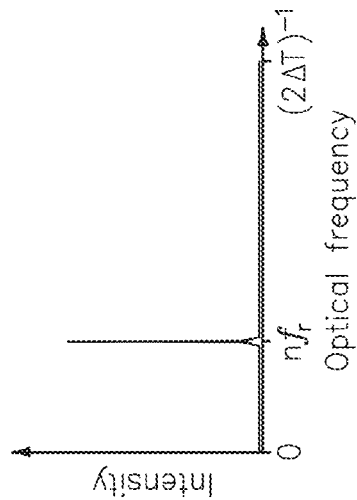
Figure 9E:
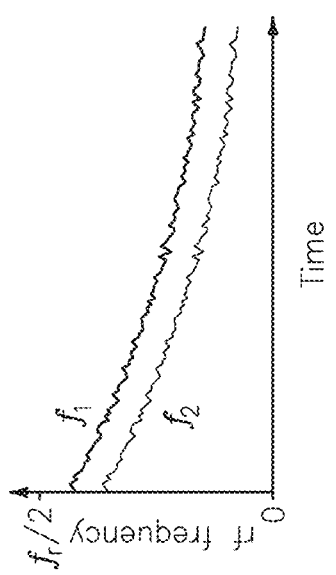
Figure 9D:
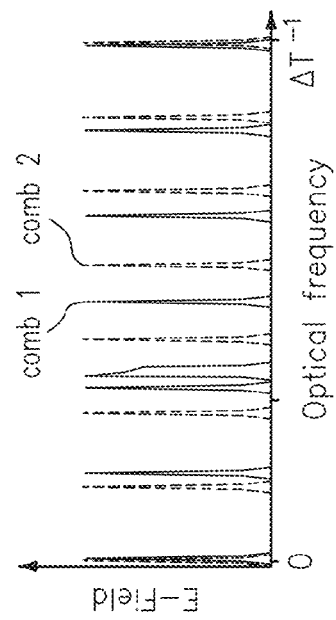

FIG. 9D is the Frequency-domain picture of the input CW laser field (grey), comb source 1 (dark) and 2 (light). Zero on the frequency axis corresponds to the teeth of combs 1 and 2 phase-locked to the underlying CW reference laser.

FIG. 9E is the instantaneous frequencies $f_{1,2}$ calculated from $V_{1,2}$, which equal the laser frequency with an ambiguity $nf_{r1,2}$.

FIG. 9F is the wideband spectrum calculated from the Fourier transform of $V_1 V_2^*$, which resolves this ambiguity.

Figure 10A:
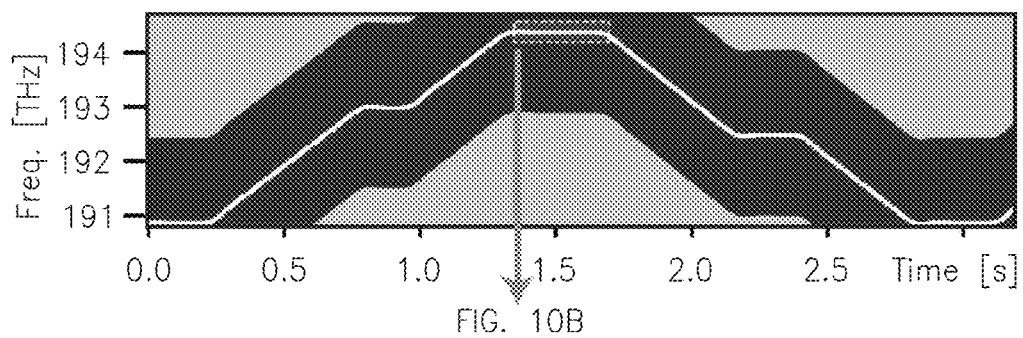

FIG. 10A is the mean frequency of an external cavity diode laser (ECDL) where the measurements are spaced by 1.6 ms. The mean frequency is calculated from the wideband spectrum. The steep slopes correspond to tuning of the ECDL grating at maximum speed, and are corrected for coherence-induced biases. The darker color indicates required a priori knowledge of the laser frequency of $\Delta T^{-1} = 3.2$ THz (25 nm).

Figure 10B:
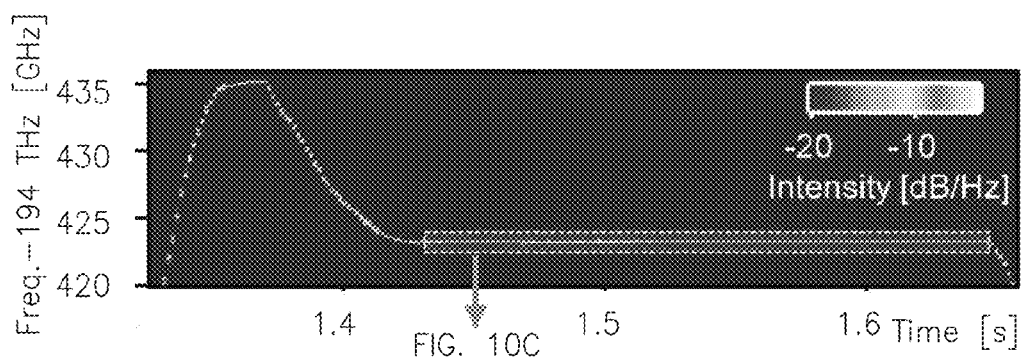

FIG. 10B is the wideband laser spectrum as the grating is stopped. See FIG. 11E for individual spectra.

Figure 10C:
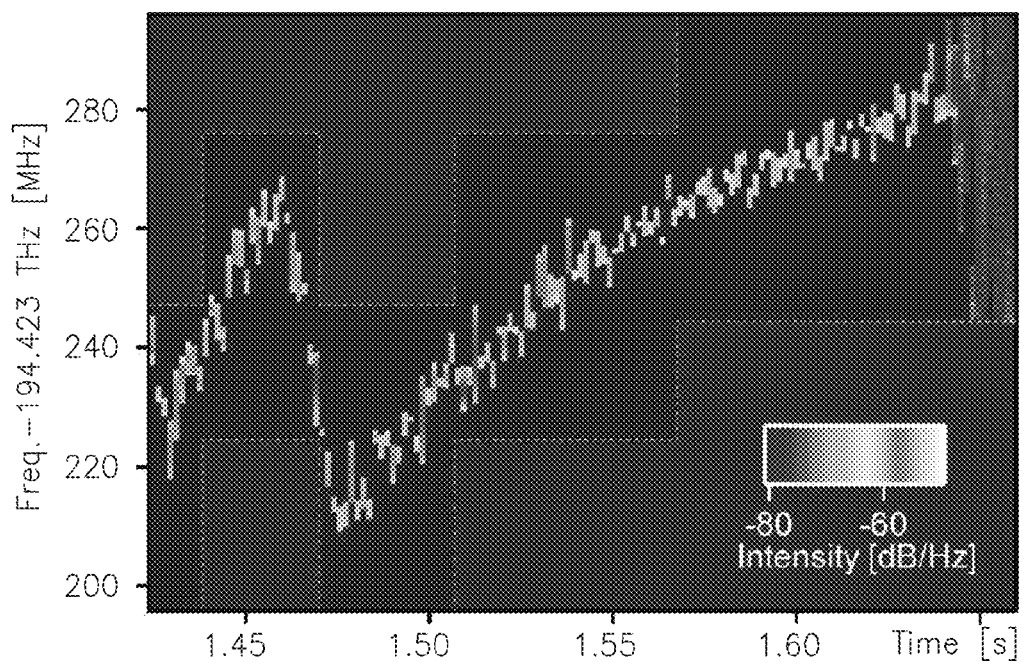

FIG. 10C is the high-resolution spectrum (false color, log scale) for the region indicated in Figure B, normalized to unity area, with the absolute frequency independently assigned from the simultaneously acquired wideband spectrum. The darker blue indicates the Nyquist bandwidth of $f_r/2$.

Figure 10D:
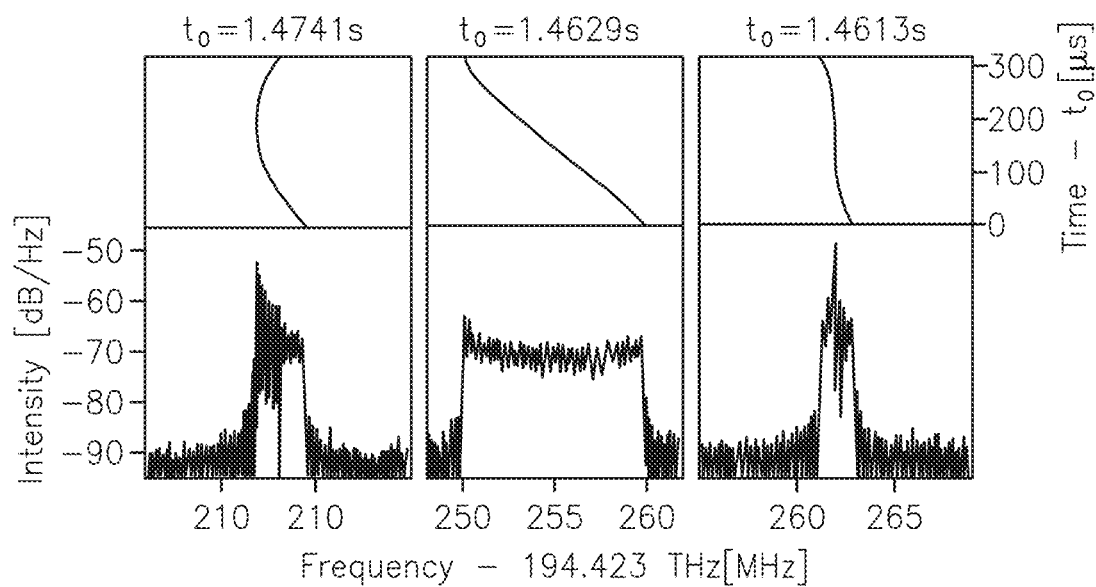
Figure 10E:
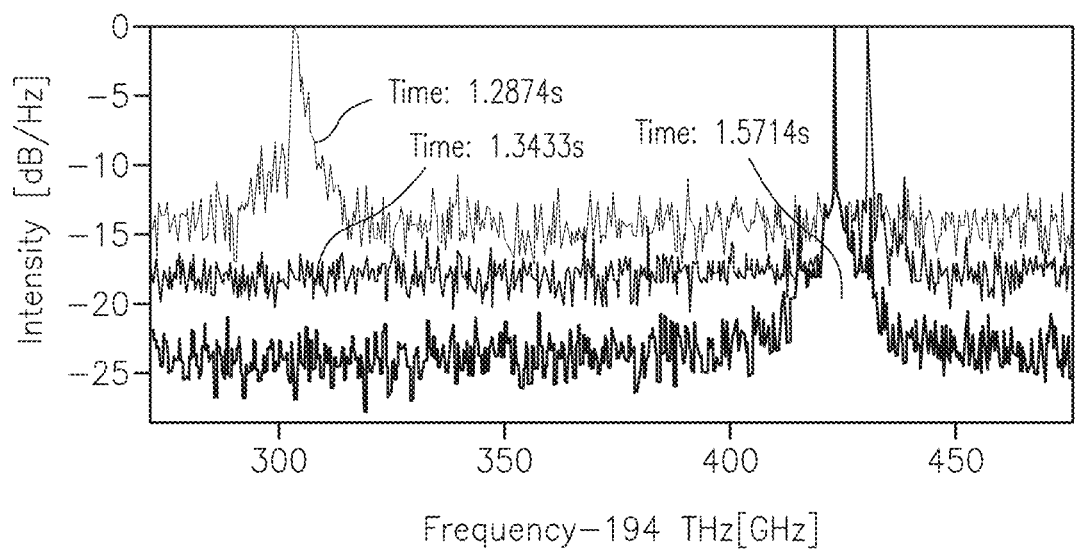

FIG. 10D is the instantaneous laser frequency over $T_W$ (top panel) and the corresponding high-resolution spectra (bottom panel), for three specific measurement times $t_0$. The frequency offset is 194.423000000 THz±1 kHz FIG. 10E is an example wideband spectra for times when the laser frequency is increasing (at 1.2874 s and 1.3433 s), and when it is relatively quiet (at 1.5714 s). The spectra are normalized to a 0 dB peak. The measured signal is the convolution of the intensity spectrum and the effective instrument response function, which is determined by the residual phase noise between the combs. For the trace at 1.5714 s, the CW laser frequency fluctuations are well below 100 MHz and ideally one expects a delta function. The SNR for this trace is ~15 dBc as measured from the peak to the close-in noise pedestal, or ~50 dBc/Hz when normalized by the 3.13 kHz resolution. At larger frequency offsets, the SNR improves to 26 dBc, or 60 dBc/Hz. This SNR is given by the magnitude of the relative phase noise between the combs, as opposed to the magnitude squared. Therefore, low residual phase noise (and linewidth) between the combs is particularly critical in narrowing the instrument response function and achieving a reasonable SNR. In addition, there can be a broadband noise contribution from the unwanted "sum frequency signal". For the data at 1.5714 s, this sum frequency beat appears offscale but is easily identified by its broader width and ignored. For the other time points, the sum frequency signal is roughly equally distributed over all Fourier frequencies and causes the raised noise floor. (IQ detection could remove this component in principle and bring these noise floors down to the level exhibited for the 1.5714 s data.).

Figure 11A:
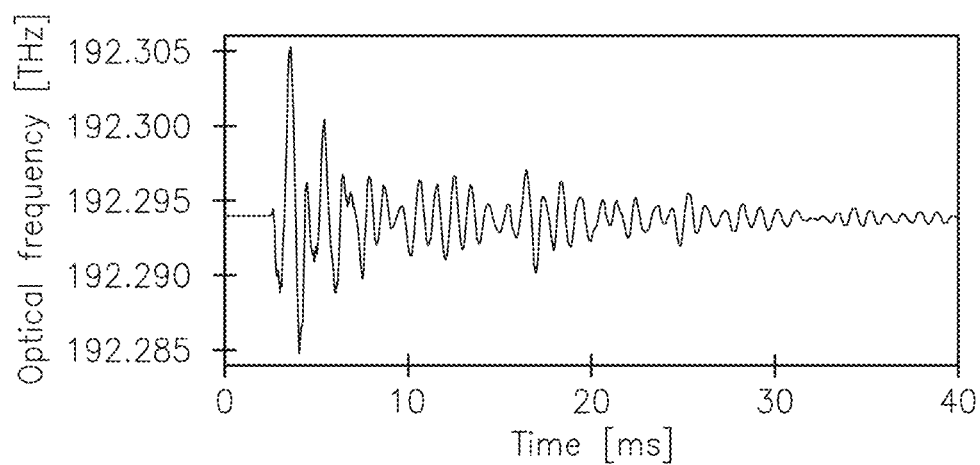

FIG. 11A is the mean frequency of a laser mechanically perturbed at t≈2.5 ms continuously monitored at a time-resolution of $T_W$≈30 µs. When the laser frequency changes by more than 50 MHz over $T_W$, the mean optical frequency is calculated from the wideband spectrum and corrected for coherence-induced biases. When the laser frequency changes more slowly, the mean optical frequency is calculated from the high-resolution (34 kHz) spectrum. The 20 GHz fluctuations are within the $\Delta T^{-1}$≈0.15 THz ambiguity. The CW laser frequency is 192.293980842 THz±1 kHz at t=0, but could fall anywhere within the 5 THz comb bandwidth, unlike CW laser heterodyne spectroscopy where the source and reference lasers must closely match.

Figure 11B:
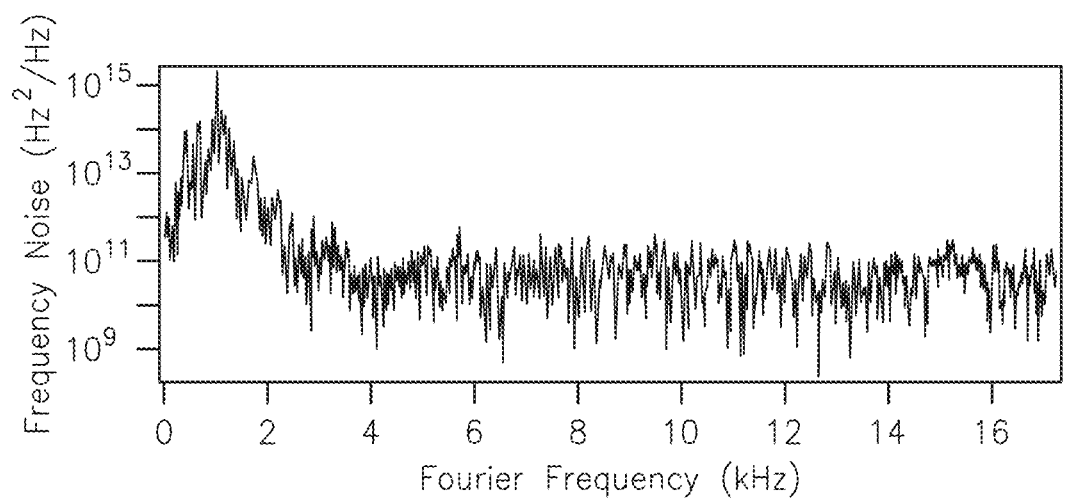

FIG. 11B is a power spectral density of FIG. 11B over a time window extending out to 0.18 s showing the mechanical system resonance at 1 kHz. The frequency noise floor is a result of the actual 10 MHz scale technical fluctuations in the laser frequency.

Figure 12:
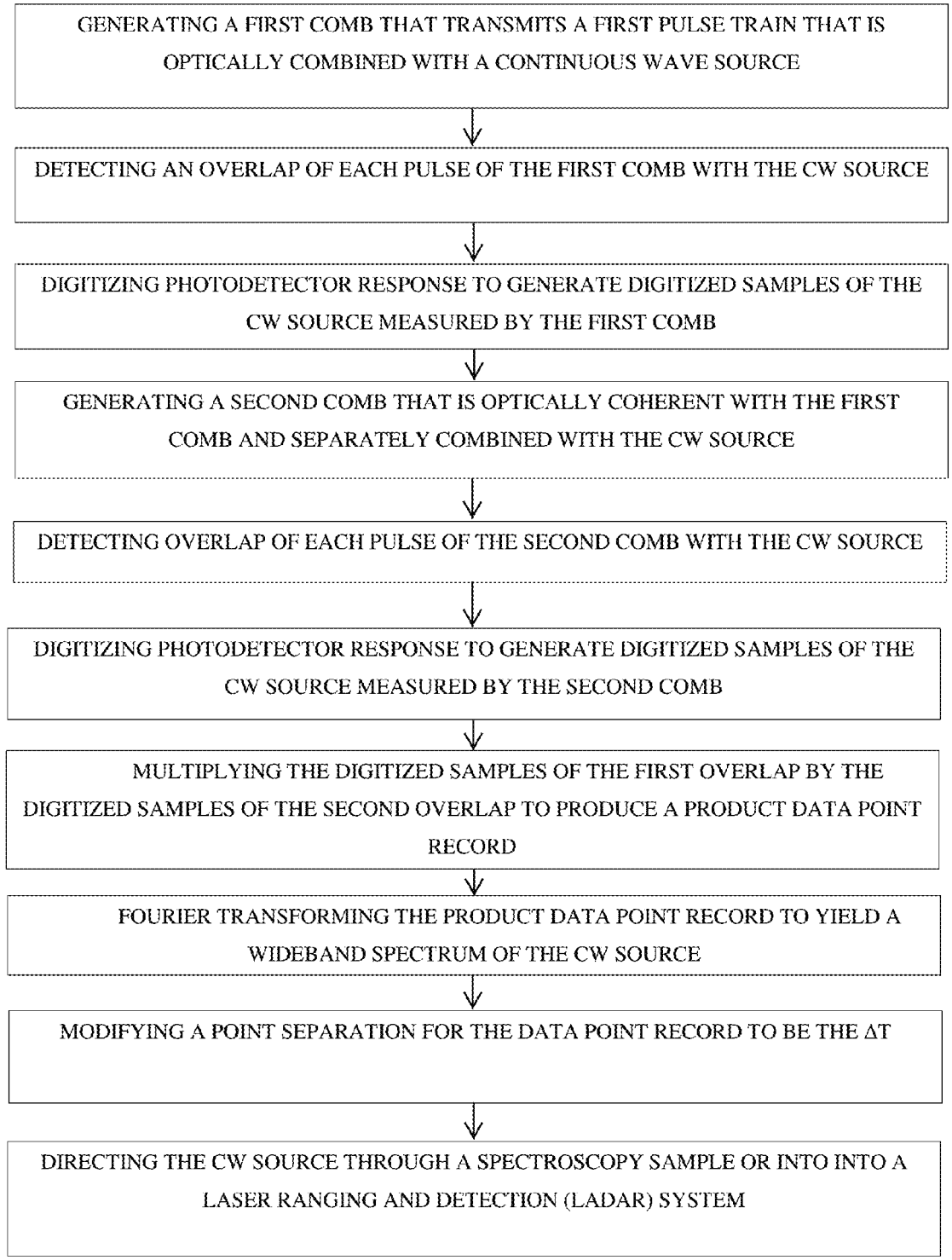

FIG. 12 illustrates a method of comb-based spectroscopy. The method includes generating a first comb that transmits a first pulse train that is optically combined with a continuous-wave source (CW source). A first overlap of each pulse of the first comb with the CW source is detected in a first photodetector. A photodetector response from the first photodetector is digitized for each pulse of the first pulse train to generate digitized samples of the CW source measured by the first comb. A second comb is generated that is optically coherent with the first comb and separately combined with the CW source. The second comb transmits a second pulse train that has a pulse period that differs by a change in time from the first pulse train and a pulse repetition frequency that differs by a change in a repetition rate from the first pulse train, where $\Delta T$ represents the change in time, fr represents the repetition rate, and $\Delta fr$ represents the change in repetition rate. An overlap of each pulse of the second comb with the CW source is detected in a second photodetector. A photodetector response from the second photodetector for each pulse of the second pulse train is digitized to generate digitized samples of the CW source measured by the second comb. The digitized samples from the first overlap are multiplied by the digitized samples of the second overlap to produce a product data point record, where a length of the product data point record is fr/$\Delta$fr points over a duration in time of 1/$\Delta$fr. A point separation for the product data point record is modified to be the $\Delta T$. The product is Fourier transformed to yield a wideband spectrum of the CW source at a resolution given by the repetition rate fr to provide an absolute frequency of the CW source with respect to a CW reference laser to which the first comb and the second comb are locked. At least a portion of the CW source is directed through either a spectroscopy sample to generate a resulting transmission signal to obtain spectroscopic information about the spectroscopy sample or into a laser ranging and detection (LADAR) system to generate a LADAR signal representing a range to a target.

DETAILED DESCRIPTION

We first give an overview of coherent dual-comb spectroscopy of passive samples and then an overview of coherent dual-comb spectroscopy applied to active CW sources.

With reference to FIG. 1A, the basic approach of coherent dual comb spectroscopy is to interfere two combs with repetition periods differing slightly by $\Delta f_r$. If the two combs are combined before the sample, the system is analogous to traditional FTS and yields the intensity absorption spectrum only. Alternatively, the source comb passes through the sample and afterwards is combined with a local oscillator (LO) comb. This approach is analogous to asymmetric or dispersive Fourier transform spectroscopy (DFTS) and yields both the magnitude and phase spectrum of the sample. Note that for the single spatial mode output of combs, alignment issues are potentially less troublesome than in DFTS.

The operation of the dual comb spectrometer can be viewed in either the time domain or frequency domain (FIGS. 1B, 1C and 1D). In the time domain, the pulses from each comb source overlap on the photo detector at varying time delays, essentially creating a virtual scanning interferometer as in asynchronous optical sampling. The resulting cross-correlation of the source and LO pulses is analogous to a conventional interferogram in DFTS.

An example interferogram is shown in FIGS. 2A-2C with a centerburst followed by a trailing electric field, which, in the case of a molecular gas sample considered here, is just the free-induction decay (FID) of the molecules. A Fourier transform of this interferogram yields the spectral response of the gas and, since the interferogram is single-sided, one obtains both magnitude and phase. Because the pulse trains are periodic and repeatedly move through each other, there is no delay between interferograms. Rather a new interferogram begins to form as soon as the previous is finished. It should be understood that the down sampling nature of this experiment introduces two time scales, which will be referred to herein as "lab time" and "effective time."

Lab time is the time taken to construct an interferogram and is characterized by a point spacing equal to the comb repetition period. Effective time corresponds to the time scale of a single reconstructed pulse and is characterized by the much smaller time step equal to the difference in comb repetition periods, given by $\Delta T = \Delta f_r / f_r^2$, where $f_r$ is the comb repetition rate (FIGS. 1B, 1C). Nyquist sampling limits require that the instantaneous optical bandwidth of the combs satisfy the relationship $\Delta v_{comb} < (2\Delta T)^{-1}$. Larger optical bandwidths can be measured by sequential measurements at different center frequencies, as done here.

In the frequency domain (FIG. 1D), the system is essentially a massively parallel laser heterodyne spectrometer. The phase and magnitude of each tooth of the source comb is measured through its heterodyne beat against one tooth of the LO comb. In order to insure a one-to-one mapping of the rf comb to the optical teeth, we require $\Delta v_{comb}/f_r < f_r/(2\Delta f_r)$, which is equivalent to the Nyquist sampling condition, $\Delta v_{comb} < (2\Delta T)^{-1}$ arrived at in the time-domain picture. Based on this Nyquist sampling constraints, for a given comb repetition rate and optical bandwidth, the minimum required time to acquire a spectrum equals $\Delta f_r^{-1}$.

With this simple picture, several important questions are immediately apparent: how to normalize the signal to remove the distortions from the LO and source spectra, how to achieve high signal-to-noise ratio (SNR) at data rates of $f_r$~100 MHz or more (i.e. much higher than conventional FTS), and what are the critical requirements on the frequency combs.

Normalization: The source light that passes through the sample is only measured with respect to the LO comb light and both can contain significant spectral structure in addition to etalon effects occurring in the beam path. Moreover this structure can vary with time. Without a rapid normalization scheme to remove these distortions, the effective SNR of the trace will be completely limited by background structure. This may be accomplished with a second interferometer. Here, a portion of the available interferogram time window is used by time-multiplexing a signal and reference pulse (FIGS. 3A, 3B and 5) to allow an update to the reference every 300-1000 µs ($\Delta f_r^{-1}$). This approach sacrifices the potential 100-MHz resolution set by the comb repetition rate for the ability to measure a fully normalized spectrum in a compact setup with a single detection channel, which is particularly well suited to the single-sided interferogram because of the larger available time window. Because the reference and signal pulses travel through nearly identical optics etaloning effects are also strongly suppressed, allowing for an extremely flat baseline. An additional advantage of normalizing the data on a sub-millisecond time scale is the suppression of 1/f noise on the laser sources.

Signal to Noise Ratio: The single point detector shown in FIG. 1 has the benefit of simplicity, high frequency accuracy, resolution, and adaptability to the mid IR and far IR. However it may suffer an intrinsic SNR limitation compared to other comb spectroscopy that uses array detection because of detector dynamic range, and broadband laser technical noise. The high frequency resolution and accuracy of a dual comb spectrometer are not of particular use unless the spectrum is measured with sufficient SNR. One route to higher absolute signal is a longer interaction length using a cavity or multi-pass cell. Cavity-enhanced single comb spectroscopy has been well demonstrated and cavity-enhanced dual comb spectroscopy has been recently demonstrated at 1 micron.

Regardless of the signal strength, one would desire as high a SNR as possible. The SNR can be improved by averaging over many interferograms in analogy with co-adding of spectra from rapid-scanning FTS systems. However, given the high digitizer rates (set by the repetition rates of ~100 MHz), the acquisition of multiple interferograms will lead to very cumbersome data file sizes, and furthermore individual phase-correction of these interferograms would require unacceptably long processing times. A solution for both these problems is to implement real-time coherent averaging by forcing the interferograms to have identical phase and summing them in real time. This coherent averaging can easily reduce file sizes by a factor of $10^4$ or more. Coherent averaging is possible only while the two combs remain phase coherent. Roughly speaking, coherent averaging requires a relative linewidth between the combs equal to the inverse of the averaging time, i.e. a relative linewidth much narrower than $\Delta f_r$.

Frequency Comb Stabilization: FIGS. 1A-1E assume ideal source and LO frequency combs, however it is the real-world spectral and noise properties of the combs and their associated stabilization schemes that determine the frequency accuracy, resolution (and spectral coverage) of the spectrometer.

A frequency comb by itself has no inherent accuracy, as the free-running comb's two degrees of freedom can drift randomly; frequency accuracy is only obtained if the comb is either locked to or monitored against some pair of absolute references. For example, if one tooth of the comb is locked to an underlying CW reference laser, as is done here, the frequency of each tooth can then be inferred from this CW reference laser and the counted repetition rate. Without an underlying reference, accuracy must be derived from a known absorption line. The resulting accuracy is typically several orders of magnitude worse than is possible with stabilized combs.

The frequency resolution is in principle limited by the comb repetition rate. However, a resolution equal to the repetition rate can only be achieved if there is no apodization and if the residual phase noise between the combs is low.

As seen in FIG. 1E, a resolution equal to the comb repetition rate requires a residual comb linewidth of $\Delta f_r$. (The residual linewidth is defined as the measured linewidth between teeth of the two combs, the absolute linewidths can be much larger). Otherwise, comb teeth in FIG. 1E will overlap ruining the one-to-one correspondence between the optical comb lines and rf comb lines, and limiting resolution to $>f_r$.

Residual linewidths below $\Delta f_r$ can enable coherent averaging, as described above, and can also allow a resolution below $f_r$. Strictly speaking, the system only samples at the discrete comb tooth frequencies, but one can in principle shift the combs and repeat the measurements to acquire data at interleaved comb frequencies. However, since spectral linewidths narrower than the repetition rate will have a time domain structure that extends across multiple interferograms, achieving resolution below $f_r$ requires continuous (unapodized) acquisition and processing of multiple contiguous interferograms. This, in turn, requires mutual coherence between the combs across the multiple interferograms. In other words, to have a resolution n times better than $f_r$, one must have residual linewidths below $\Delta f_r/n$ Within the context of the above discussion, multiple approaches to stabilizing the frequency combs have been used in dual comb spectroscopy. The use of free-running combs, i.e. femtosecond lasers, is certainly the simplest method and was used in a pioneering demonstration of dual comb spectroscopy; however such an approach provides no absolute frequency accuracy, has limited frequency resolution and coherent averaging is challenging (although coherent averaging has been achieved in the far-IR where carrier phase is less of a problem). In an intermediate approach, the carrier frequency of each comb is phase-locked to a common reference CW laser, and the pulse repetition rates are monitored. The carrier frequency of the free-running combs may alternatively be monitored and the signal corrected in post processing. This approach removes the main source of drift the carrier phase and can provide high frequency accuracy if the reference laser frequency is known. To further enhance the coherence between the combs both combs can be fully phase-locked to a pair of calibrated CW reference lasers (the approach taken here). The accuracy of the combs is set by the CW reference laser frequency, which is measured with a separate self-referenced comb against a Hydrogen maser and is accurate to ~10 kHz (limited by drift in the CW reference between measurements). This accuracy generally far exceeds the statistical uncertainty in the line center of a Doppler-broadened line (even for the high SNR signals demonstrated here) and a looser CW reference with MHz accuracy locked to a simpler cavity, molecular line or even fiber loop would suffice. With our approach, the phase locks are sufficiently tight such that the residual linewidths are ~0.3 Hz and allow for long coherent averaging times of 3 seconds and a corresponding improvement in SNR.

If high phase stability is required over a very broad bandwidth, one could self-reference the comb using the standard carrier envelope stabilization techniques in combination with a lock to a single optical reference.

The optical layout of the experimental system is described next. With reference to FIG. 3A, the two comb sources are erbium-doped femtosecond fiber lasers with repetition rates $f_{r,LO} \approx f_{r,S} \approx 100$ MHz that differ by $\Delta f_r = 3.14$ kHz for most of the data shown here and are centered around 1560 nm. $\Delta f_r$ yields the effective time step $\Delta T = \Delta f_r/(f_{r,S} f_{r,LO})$ between the source and LO pulses. The comb outputs are amplified to 20 mW in a short erbium-doped fiber amplifier which also provides a small amount of spectral broadening.

A splitter after the amplifier (not shown in FIG. 3A) directs a portion of the light to the phase-locking setup described below. The remainder of the source pulse train is directed through the interferometer signal and reference paths and polarization multiplexed with the LO pulse train. The combined reference and signal then pass through a tunable grating monochromator which filters the light prior to detection and digitization. For data shown in FIG. 6-7 the filter has 2 nm (200 GHz) full-width half-maximum (FWHM) Gaussian profile. Data taken with different filter center wavelengths are separately processed, as described later, and then coherently stitched together to generate the total spectrum.

The optical filter is not necessary and an alternative design is to use the full comb spectrum. On one hand, the filter reduces the power on the detector and requires multiple measurements to reconstruct the spectrum. However, in a shot noise limited system this additional measurement time is exactly offset by the lower noise of a reduced spectrum. Moreover, in the dynamic-range limit (set by detectors or digitizers), filtering the spectrum can lead to an overall increase in SNR. Frequently, the system is dynamic range limited near the center of the spectrum and the filter improves the SNR.

Spectral filtering allows the system to simultaneously meet Nyquist sampling conditions and suppress 1/f noise. Specifically, the filtered comb bandwidth ($\Delta v_{comb}$) must be limited to $\Delta v_{comb} \leq 1/(2\Delta T) = f_{r,S} f_{r,LO}/(2\Delta f_r)$, to avoid aliasing. Thus a broad spectral bandwidth requires a low value for the difference in comb repetition rates, $\Delta f_r$. However, the interferogram updates at $\Delta f_r$ and will be degraded by 1/f noise in the comb spectra at low values of $\Delta f_r$. The use of the filter allows us to maintain the high scan speed ($\Delta f_r$) by limiting the instantaneous spectral bandwidth, and later recover the entire spectrum through coherent stitching.

In the disclosed non-limiting embodiment, after the filter, the orthogonally polarized signal and LO pulses are mixed with a fiber-coupled polarizing beam combiner oriented at 45° with respect to the laser polarization states. Polarization paddles are used to fine tune the balancing of light levels. The two outputs of the beam combiner are incident on a 110 MHz commercial balanced detector. Balanced detection suppresses the strong homodyne signal from the individual pulses and allows maximization of the dynamic range available for the heterodyning between the pulses. The output of the detector is low pass filtered at 50 MHz to avoid aliasing of signals above the Nyquist frequency and to relax the timing between the digitizer clock and the pulse arrival on the photodiode. The detector signal is then digitized by a 100 MHz 12-bit digitizer.

As shown in FIG. 3A, the LO passes through a 120 MHz acousto-optic modulator (AOM) and fiber switch to select either the first (shifted) or zeroth (unshifted) order beam from the AOM. There are two benefits to the AOM. First the LO power can be adjusted via the AOM's rf power to avoid photodetector saturation as the optical filter is tuned from high to low power regions of the comb spectra. Secondly, at certain optical filter positions the rf beat between the combs falls near the Nyquist frequency ($f_{r,LO}/2$) or near 0 Hz. At either of these frequencies, aliasing effects lead to spurious data. These regions are avoided by shifting the rf interferogram using the first-order deflected beam thus shifting the LO by $\sim f_{r,S} + f_{r,S}/4$ (~125 MHz). Maintaining carrier phase of the interferogram during coherent averaging does require the AOM be driven at an integer multiple of $\Delta f_r$, but this shifting is otherwise straightforward. One could suppress these reflections about Nyquist with IQ detection however it is difficult to realize more than 20 dB of suppression from an optical IQ detector and 1/f noise would remain near 0 Hz.

With reference to FIGS. 4A-4B, the basic method to phase-lock the two Er fiber combs together are schematically illustrated. A pair of comb teeth from each comb are locked to two CW reference lasers at 1535 nm and 1560 nm respectively. With this setup, in the frequency domain the source and LO combs exactly overlap every K and K+1 modes respectively, where $K+1=N_1$, defined earlier. In the time domain, the LO and source pulses exactly overlap every K pulses and K+1 pulses respectively. K sets both the number of samples in a single interferogram and the scaling between lab time and effective time (e.g. FIG. 3B axes). For most data shown here, K=31834. The integer length of the interferogram greatly simplifies coherent signal averaging as discussed below.

Both CW reference lasers are stabilized to the same high-finesse optical cavity via a Pound Dreyer Hall lock (PDH). In practice, the measured frequency of the 1560-nm laser and the measured repetition rates of the two combs, with respect to a Hydrogen maser are used to calculate the optical frequency of the source and LO comb teeth. Accuracy is linked directly back to the Hydrogen maser in this fashion. Note that in this case, the 1535 nm laser does not need to be cavity-stabilized as well but it is convenient.

In the disclosed non-limiting embodiment, the two combs are phase-locked to the CW lasers in an identical fashion. The comb light is combined with the two cavity-stabilized CW lasers, spectrally filtered to two channels at 1535 nm and 1560 nm with a 1 nm width, and detected on two 100 MHz detectors, as shown in FIG. 4B. Each detector detects a beat signal between the comb and one CW laser. The two beat signals are then used in two separate servos to tightly phase-lock the combs. Coarsely speaking, the 1560 nm light is used to stabilize the comb carrier frequencies and the 1535 nm light to stabilize the comb repetition rates (in truth these parameters are coupled). Because the optical bandwidth is relatively small compared to the carrier frequency, the carrier stabilization lock is the more critical of the two locks. For this lock, the rf beat signal is divided between the comb and 1560-nm laser by eight to increase the capture range and lock the divided signal to a 10 MHz reference by feeding back to an AOM with 100 kHz bandwidth and a much slower, but higher dynamic range, intracavity PZT. The servo to the PZT effectively removes much of the lower frequency noise on the repetition rate of the comb as well. However, to fully stabilize the repetition rate, we use the beat signal between the comb and the 1535 nm light, which is fed into a servo filter whose output is fed to the pump current for the laser cavity. By controlling the pump current, the repetition rate is controlled while roughly holding the carrier frequency fixed. The feedback bandwidth is ~10 kHz limited by the laser dynamics combined with the erbium response. The 10 kHz is sufficient, however, phase lead compensation could achieve higher bandwidths.

The data acquisition is described next. The signal is digitized at the LO repetition rate to match the effective optical sampling of the LO pulses, which translates to a high sample rate. To reach a high SNR requires signal-averaging of multiple interferograms just as in conventional FTS. However, the brute force approach of directly digitizing the signal for as long as possible leads to massive data sets and makes deep averaging impractical. Therefore, instead coherent averaging is implemented by phase-locking the two combs as described above such that each interferogram is exactly an integer number (K) of points with exactly the same phase. In that case, successive interferograms in real time may be summed either onboard an FPGA or in software for a time approximately equal to the inverse of the relative linewidth between the combs. The requirement on the relative comb linewidth for coherent averaging is very demanding; we require linewidths$<\Delta f_r/N_A$, where $N_A$ is the number of coherently averaged interferograms.

In the disclosed non-limiting embodiment, the system coherently averages for ~3 seconds corresponding to $N_A$=10,000 interferograms and a ~0.3 Hz relative comb linewidth. The commercial digitizer must be triggered for each successive interferogram. A trigger, accurate to below the 10 ns clock period, is achieved with a digital pulse counter to divide the LO clock signal by K (FIG. 3A). The digitizer may require a small (~20 μs) dead time between triggers which leads to a slight loss in frequency resolution (~7%). At a 200 Mbyte per second sampling rate, a 600 MB data stream is reduced to 60 kB (or by $10^4$) with a corresponding decrease in processing time because the FFT is performed on the shorter data set. For acquisition periods greater than 3 seconds, drifts in optical path lengths and noise in the phase locks leads to a relative carrier phase drift between combs. Therefore, the sequential 3-second coherently summed interferograms must be phase corrected, based on the phase of the centerburst corresponding to the reference peak, and then sum them to generate an interferogram at longer averaging times.

Phase correction may also be applied more frequently to relax the requirements on the mutual coherence (residual linewidth) between combs but the processing load and data transfer from the digitizer will add additional dead time. However, more sophisticated FPGA's could make this real-time correction practical.

The first step of the data processing is to change the scaling of the data from laboratory time to effective time. Given the locking scheme used here, this scaling is straight-forward. The sample point spacing is set to equal the effective time step $\Delta T=\Delta f_r/(f_{r,LO}f_{r,S})=1/(Kf_{r,S})$. The three quantities $\Delta f_r$, $f_{r,LO}$, $f_{r,S}$, are measured with frequency counters.

The time multiplexing of reference and signal pulses discussed earlier yields the optical interferogram, $V(t_i)$ seen in FIG. 5A, where $t_i$ is in effective time, with the two pulses separated by 2.6 ns and the signal peak is defined to be zero time. A "reference-only" time trace is generated by gating out all but the reference pulse, to form $V_R(t_i)=\langle V(-4.7 \text{ ns}<t_i<-1.3 \text{ nsec})\rangle$ and zero-padded to a length K. Similarly, a "signal-only" time trace is generated by gating out all but the signal pulse to form $V_S(t_i)=\langle V(-1.3 \text{ nsec}<t_i<4.6 \text{ nsec})\rangle$, which is also zero-padded to K points. To deconvolve the reference from the signal, the two signals are first Fourier transformed to yield their respective complex spectra (FIG. 5B). The ratio yields the complex molecular response, shown in FIG. 5C, for the filter centered at λ as $\tilde{H}_\lambda(v_k)=\tilde{V}_S(v_k)/\tilde{V}_R(v_k)$, where the tilde represent a Fourier transform evaluated on the optical frequency grid $v_k$ with a known optical offset $v_0$ discussed below.

Because the time trace is padded to K points, the frequencies $v_k$ correspond precisely to comb teeth of the signal comb. The resolution of the system is set by the temporal length (i.e. apodization) of $V_S(t)$ giving a resolution of 1/4.6 ns≈220 MHz. The reference pulse is more strongly apodized with less spectral resolution to limit the contribution of noise from the reference to the final deconvoluted signal. Generally the reference pulse window must only be broad enough to contain any etaloning features (<1ns) that also appear on the signal.

The optical frequency offset, $v_0$, is calculated from the measured frequency of the 1560 nm CW laser, the known rf offsets in the phaselocking, the known AOM frequency shift if present, and the measured repetition rate. For example, for the unshifted LO comb, $v_0=v_{1560}+f_{lock}+pKf_{r,S}$ where $V_{1560}$ is the measured frequency of the 1560-nm CW reference laser, $f_{lock}$ is the rf offset of the phase lock to the 1560 nm laser, and p is an integer chosen such that $v_0$ is close to the optical bandpass filter center. The term $pKf_{r,S}$ reflects the ~1.5 THz Nyquist ambiguity resulting from the ΔT time step. In addition the sign of the frequency axis of spectra in FIG. 5B is changed from positive to negative as necessary. Assigning the negative sign and values for p can be done with ~1 nm level knowledge of the filter position. Thus applying these shifts correctly requires only a coarsely calibrated optical filter.

Despite the normalization, some slow background wander may remain on $\tilde{H}_\lambda(v_k)$ due to multiplicative phase noise. While small (~0.1% in magnitude or 1 mrad in phase), this wander can lead to ripple on the concatenated data. Therefore, we first remove it by separately fitting the magnitude and phase profiles of $\tilde{H}_\lambda(v_k)$ to a third-order polynomial over a range covering the FWHM of the optical filter. The magnitude is then normalized to unity by dividing by the magnitude fit, and the average phase is set to zero by subtracting the phase fit. Strong absorption features can throw off the fits, so we mask out features that deviate from the baseline by more than 2%. For the phase profile it is sufficient to apply a 7 GHz box-smooth prior to fitting. Note that this filtering technique would have to be reconsidered if one were looking at very broadband spectral features.

The individual $\tilde{H}_\lambda(v_k)$ are then coherently stitched together, i.e., concatenated, to generate an overall response function covering the full frequency span and at a spacing $f_{r,S}$. Because the combs are phase-locked to stabilized CW lasers, the optical frequencies are stable over the measurement period and there are no issues in the concatenation. This processing involves only fast Fourier transforms, which are indeed fast if K is factorable into small prime numbers.

The measured sample response can be viewed in the frequency, time, and joint time-frequency domains. With reference to FIGS. 6A and 6B, the measured frequency-domain response is in terms of both transmission and phase shifts for the ro-vibrational band corresponding to the first overtone C—H stretch in hydrogen cyanide (HCN) for a 2.7-Torr cell and a 25-Torr cell, along with an empty reference cell. The frequency domain response is given by $\tilde{H}(v)=1+4\pi^2 ic^{-1}v\chi(v)L$, where L is the length, χ the linear susceptibility of the sample, c is the speed of light, and v is the optical frequency. For weak gas absorption $\tilde{H}(v)\approx 1-\alpha(v)L/2+i\Delta k(v)L$, where α(v) is the usual absorption coefficient and Δk(v) is the corresponding phase shift. For the case of simple, well separated absorption lines considered here, the absorption lines appear with the standard Voigt profile and the phase shift with the corresponding "derivative"-shape. (These are actually just the real and imaginary parts of the complex Voigt function or error function for complex arguments.) Note that this signal differs from the simple absorption spectrum, α(v), usually generated in grating spectrometers or typical double-sided FTS, because we retrieve both the magnitude, α(v)/2, and the phase. Of course, using Kramers-Kronig relations one can in principle retrieve the phase from the magnitude spectrum; by measuring it directly any complications due to finite acquisition bandwidth are avoided.

In the time domain (see FIGS. 7A-7C), the signal is simply the Fourier transform of the above frequency-domain signal convolved with a sinc function (corresponding to the spectral bandwidth, $\Delta v$, of the normalized response) or $\tilde{H}(t) \approx e^{-i2\pi v_c t} \text{sinc}(\pi t \Delta v) \otimes [\delta(t) + 4\pi^2 i c^{-1} v_c \tilde{\chi}(t) L]$, where the Fourier transform of $v\chi(v)$ is approximated as $v_c \tilde{\chi}(t)$ where $v_c$ is the average carrier frequency. Physically, the forward scattered light or free induction decay of the excited molecules are observed. The initial pulse excites a superposition of ro-vibrational states. These vibrating states act as dipole emitters. However, they quickly rotate out of phase with each other to give no coherent forward scattered signal. Because the rotation rates are quantized, they rotate back in phase a short time later (set by the rotational constant), giving rise to another burst of coherent radiation in the forward direction, long after the excitation pulse has ended (FIG. 2B or 7C). The mathematical description follows earlier work on two-level systems by Brewer and coworkers, or the work on commensurate echoes in THz time-domain spectroscopy or rotational recurrences in pump probe spectroscopy.

Of course, there is no particular reason to view the signature in the purely time or frequency domains, and in FIGS. 7D-7E a joint time-frequency domain picture is shown at two different gas pressures. In this picture, the band at zero time is the reconstructed initial pulse and the trailing signal at later times is the frequency-resolved free induction decay amplitude. Each HCN absorption line is (slightly counter-intuitively) evident as a trailing signal. The effect is due to the slowing of the light near the resonance which delays the transmitted light at that frequency. The overall signal decays as a result of collisions and Doppler effects. The collisions cause a phase-shift or de-excitation of the vibrating, rotating molecules so that they no longer add coherently. The Doppler shifts can be viewed as the molecules moving out of their original position so that their emitted dipole radiation no longer adds phase-coherently in the forward direction. Collisional effects dominate for the higher pressure cell and the effects of resonant collisions is evident in the faster relaxation of the more highly populated ro-vibrational states. Doppler relaxation dominates for the lower pressure cell.

The nominal signal-to-noise ratio will depend on whether it is quoted in the time or frequency (or joint time-frequency domains). The time-domain SNR is measured as the ratio of the peak of the interferogram to the standard deviation of the noise as measured from either the empty cell or, equivalently, before the centerburst. At a point spacing of 55 fs over the 6 ns time window, we obtain a time-domain SNR of $$SNR_t = 1.1 \times 10^4 T^{1/2} \quad (1)$$

as a function of total acquisition time, T. For the longest acquisition time of T=45 minutes for the data of FIG. 8, we measure $SNR_t = 0.55 \times 10^6$. (Note that in calculating this SNR we use the noise near the centerburst, which is larger by $\sqrt{2}$ than the noise at longer time offsets due to the effects of deconvolution.) This noise carries over to the frequency domain, where we measure an average SNR across the 41,000 frequency elements that span the full 9 THz of $$SNR_f = 50 T^{1/2} \quad (2)$$

in radians or fractional magnitude change in the reconstructed spectrum. The peak SNR near the center of the spectrum is about twice as high or $100 T^{1/2}$ over a 1 THz window.

If the time-domain noise is white, then the transformation from Eq. (1) to Eq. (2) is straightforward. Specifically, $SNR_f = SNR_t/\sqrt{M}$, where M=9 THz/220 MHz=41,000 is the number of resolved frequency points. Although the frequency noise is not completely white due to variations in the comb power across the spectrum, this relationship roughly holds because $SNR_t/\sqrt{M} = 54 T^{-1/2}$ in agreement with Eq. (2).

In terms of sensitivity for trace gas detection, the minimum detectable absorption $L\alpha_{min}$ is often used as system metric. Eq. (2) gives the SNR for the magnitude, $L\alpha(v)/2$, so that one might consider twice that value as a measure of the sensitivity. However, this relation oversimplifies the situation for several reasons. First, the measurement is made at much higher resolution than a typical spectral linewidth; the signal across the entire line contributes to the overall sensitivity and there is a corresponding increase in sensitivity over Eq. (2) of a factor of $\sim\sqrt{\Delta v_L/v_{res}}$, where $\Delta v_L$ is the FWHM collisionally broadened linewidth and $v_{res}$ is the system resolution. (This is the SNR enhancement for smoothing the data to the resolution of the spectra of interest). Moreover, the measurement is made over multiple spectral lines and the signal across all the spectral lines contributes to the overall sensitivity. Therefore a matched filter yields a sensitivity that is actually improved by a factor of $\sqrt{(\pi/4)\Sigma_i \alpha_i^2 \Delta v_{Li}/(\alpha_0^2 v_{res})}$ where the $i^{th}$ line has peak absorption $\alpha_i$ and Lorentzian FWHM linewidth $\Delta v_{Li}$ and the sum is over all ro-vibrational lines. With these extra factors, for HCN, the absorption sensitivity is improved over Eq. (2) by ~10. However, even including these extra factors, the dual comb spectroscopy is hard pressed to compete in terms of sensitivity with a single swept CW laser spectrometer under identical conditions. The advantage of the dual comb system is the absolute frequency accuracy, high frequency resolution, and the broadband coverage that should allow for good discrimination against other absorbing species.

Coherent dual comb spectroscopy can be viewed as massively parallel heterodyne laser spectroscopy, infrared time-domain spectroscopy, or a form of dispersive Fourier transform spectroscopy. We provide a general discussion of some of the important attributes of dual comb spectroscopy including frequency accuracy, resolution, normalization, and sensitivity. These considerations motivated our particular dual comb spectroscopy design, which is described in detail. We demonstrate that reasonably high SNRs can be achieved with a single point detector over a large number of resolved frequency elements through coherent averaging. Detector arrays or selected filtering bring the possibility of more rapid acquisition of high SNR spectra. We note many of the SNR and accuracy considerations here apply as well to dual comb LIDAR. for further understanding of other aspects of the LIDAR and associated dual comb usage, attention is directed to U.S. patent application Ser. No. 12/883,491, entitled Optical Frequency Comb-Based Coherent Lindar which is assigned to the assignee of the instant disclosure and is hereby incorporated herein in its entirety. As a demonstration of the capabilities of dual comb spectroscopy, we measured the fully normalized, complex response of the ro-vibrational band of HCN for the first overtone of the C—H stretch. This measurement covers a 9 THz bandwidth with 41,000 resolution elements. The peak frequency domain uncertainty is 0.025% in magnitude giving a peak fractional absorption sensitivity of 0.05% (converting to intensity) and 250 microradians in phase.

There are many other potential configurations of dual comb spectrometers including the incorporation of remote fiber delivery, long interrogation paths, multipass cells or cavities, detector arrays etc. This approach may additionally be combined with multi-dimensional spectroscopy.

Another such configuration is a coherent dual-comb-based spectrometer reconfigured to measure an active CW source. Because the dual comb spectrometer can provide measurement with both high accuracy and high update rates, the system is capable of measuring CW optical waveforms at 30-μs and 320-μs time resolution over THz bandwidths. Within each time interval, the spectrometer returns the laser frequency spectrum with kHz absolute accuracy and time-bandwidth limited precision. Unlike etalon-based techniques, each measurement is independently calibrated, which allows for discontinuous source tuning between measurements and the characterization of arbitrary CW waveforms. Unlike previous dual-comb frequency metrology, this system is coherent so that the measurements can be made rapidly with time-bandwidth limited resolution and accuracy. This configuration readily enables, for example, optimized waveforms for sensing applications including multi-species gas detection, coherent laser radar, and optical metrology.

Nearly all high sensitivity optical-based sensing relies on CW lasers because of their high photon flux, long interaction paths and ever-increasing frequency agility. Current CW lasers are capable of tuning rapidly or even hopping to different optical frequencies over THz of optical bandwidths, creating broadband CW optical waveforms, particularly in the telecommunication band. The challenge is that, unlike agile rf sources, the waveforms from free-running lasers are loosely controlled and not highly reproducible, particularly in optical frequency. Phase-locked laser systems have demonstrated well-controlled scanned or stepped optical waveforms using frequency combs, but with limited speed and/or bandwidth. For fast, wide-bandwidth measurements, a continuously tunable laser is usually swept in a quasi-linear ramp and referenced (i.e. linearized) against an etalon or, for higher linearity, phase locked to an interferometer. The dispersion and pathlength drift of the etalon/interferometer will limit the accuracy of these methods; these limitations can be overcome by referencing the swept laser to the evenly spaced modes of a self-referenced frequency comb for MHz accuracy. However, one is still restricted to a quasi-linear sweep with limited speed and any absolute frequency determination requires a separate measurement. Furthermore, the requirements on the CW laser source are restrictive as it must tune continuously since mode-hops or frequency jumps will destroy the calibration. More importantly, a linear sweep can be wasteful in acquisition time. For example in spectroscopy or optical metrology, the laser would ideally jump to spectroscopic features of interest and then scan slowly across the lineshape. Similarly, in LIDAR more complicated waveforms would enable optimized range-Doppler ambiguity functions or synthetic aperture LIDAR similar to RADAR systems.

A dual-comb spectrometer capable of the rapid absolute measurements of a dynamic CW laser thereby enabling the calibration of discontinuous/arbitrary CW waveforms from free-running lasers. Frequency combs, based on stabilized femtosecond lasers, have allowed for metrology of static lasers with unrivaled frequency accuracy.

It should be understood that a comb is an ideal ruler against which to measure a CW laser's instantaneous frequency, provided two issues are addressed. First, the phase noise contribution of the frequency comb must be negligible, which is achieved through sub-radian phase-locking to a stabilized CW reference laser. Second, the measurement ambiguity must be removed equal to the comb repetition rate. This can be done by a Vernier approach using combs with different repetition rates as suggested by Ma; Peng et al. have measured absolute laser frequencies within seconds in this way. Here this technique is extended to optically coherent combs, allowing for time-bandwidth limited measurements at sub-millisecond time resolution. The approach disclosed herein is similar to coherent dual-comb spectroscopy but applied to an active source rather than a passive sample.

With reference to FIG. 8A, an alternate non-limiting embodiment of the system is adapted from the coherent dual-comb spectrometer discussed above. The basic operation is outlined in FIGS. 9A-9F. The two comb sources have repetition rates $f_{r1} \approx f_{r2} \approx f_r = 100$ MHz that differ by $\Delta f_r = f_{r2} - f_{r1}$, and corresponding periods $T_1 = f_{r1}^{-1}$ and $T_2 = f_{r2}^{-1}$ that differ by $\Delta T = T_1 - T_2$. A comb source (e.g. comb 1) outputs a series of short pulses, $E_1(t-mT_1)\exp[i\delta\phi_1(mT_1)]$ where m is the pulse number and for simplicity we assume zero carrier-envelope offset (ceo) phase so that $\delta\phi_1$ represents carrier phase noise. These pulses are combined with the CW laser field, $E_L(t) \equiv E_L \exp[i\theta_L(t)]$, with amplitude $E_L$ and phase $\theta_L(t)$. We wish to determine the instantaneous frequency $f_L(t) = \dot\theta_L(t)/(2\pi)$. Since the pulses are short, they act as a delta-function and their detected overlap with the laser field yields the sample voltages $V_1(t_1) \propto E_L \exp(i[\theta_L(t_1)-\delta\phi_1(t_1)])$ at discrete times $t_1 = mT_1$. According to the sampling theorem, for an instantaneous laser linewidth below $f_{r1} = T_1^{-1}$, the instantaneous frequency of $V_1(t_1)$ is $f_1(t_1) = f_L(t_1) - \delta\dot\phi_1(t_1)/(2\pi) - nf_{r1}$, where the integer n reflects the ambiguity inherent in sampling non-baseband signals. In a comb picture, $f_1$ is the heterodyne frequency of the CW laser with the nearest comb tooth, labeled n. The above discussion equally applies to comb 2, resulting in $V_2(t_2)$ at times $t_2 = mT_2$ with instantaneous frequency $f_2(t_2) = f_L(t_2) - \delta\dot\phi_2(t_2)/(2\pi) - nf_{r2}$. For negligible comb frequency noise, $\delta\dot\phi_{1,2} \to 0$, the measured $f_{1,2}$ equals the instantaneous laser frequency $f_L$, with an ambiguity $nf_{r1,2}$, and the Fourier transform of $V_{1,2}$ is a high-resolution laser spectrum with the same ambiguity.

The unresolved ambiguity $nf_{r1,2}$ exceeds any a priori information on $f_L(t)$, particularly for a rapid, discontinuously tuned laser. In the spirit of Refs. and Fourier spectroscopy to resolve this ambiguity, we consider the product $V_1 V_1^*$, which is a measure of the correlation of the E-field at differential sample times $\Delta t = t_1 - t_2 = m\Delta T$. Over a laboratory measurement time $T_W \equiv \Delta f_r^{-1}$, this time coordinate $\Delta t$ ranges from 0 to $T_2$ as the pulses of comb 1 raster through the pulses of comb 2. For negligible residual comb noise, $(\delta\phi_1 - \delta\phi_2) \to 0$, and $f_L(t)$ stable over $T_W$, $V_1 V_2^* \propto |E_L|^2 \exp(i2\pi f_L \Delta t)$ expressed as a function of $\Delta t$, and its Fourier transform with respect to $\Delta t$ yields the "wideband" laser spectrum at resolution $f_{r2} = T_2^{-1}$ with a much coarser ambiguity $\Delta T^{-1}$. In other words, we can now resolve the fine ambiguity, $nf_{r1,2}$, to identify $f_L$ to within $\Delta T^{-1} \gg f_r$, which completes the measurement assuming some coarse a priori knowledge of $f_L$. The total measurement bandwidth is limited only by the comb spectral width. We identify the required observation time of $T_W = \Delta f_r^{-1}$ as our spectrometer's time resolution.

The above discussion assumed $f_L$ changed slower than $f_r/T_W$. However, this processing gives the wideband spectrum for broadband sources as well provided there is no coherence between spectral elements. A strongly chirped CW laser ($\dot f_L > f_r/T_W$) will exhibit such coherence and the spectrum is distorted, which must be corrected for in the frequency estimation. It should be understood that the operation of the spectrometer can be described in the frequency domain or time domain (see FIGS. 9D-9F and 9A-9C), where it is similar to a linear optical sampling system or Fournier spectroscopy Complex signals $V_{1,2}$, require IQ detection, but heterodyne detection yields only real signals. Consequently, the measured frequencies "fold" about a Nyquist frequency of $f_r/2$ for the high-resolution spectrum and $(2\Delta T)^{-1}$ for the wideband spectrum. In particular, the wideband spectrum, which is calculated by multiplying $V_1$ and $V_2$, setting the point spacing to $\Delta T$, and taking the Fourier transform is shown below to be proportional to the product $I_{comb}(f_{opt} \pm nf_{r2}+q\Delta T^{-1})I_L(f_{opt} \pm nf_{r2}+q\Delta T^{-1})$, where $I_{comb}$ is the comb intensity spectrum, $I_L$ is the laser intensity spectrum, $f_{opt}$ is an offset frequency equal to the frequency of the common comb tooth phase-locked to the underlying 1560 nm CW reference (or 1535 nm reference) laser, n runs from 0 to N/2, and q is an integer. In other words, we obtain the product of the comb and source intensity spectra evaluated on a frequency grid with spacing $f_{r2}$, an offset frequency $f_{opt}$, and Nyquist frequency $(2\Delta T)^{-1}$. The spectral dependence of the comb can be removed by normalizing the signal with a simultaneous measurement of the total CW laser power. For a broad coherent source, the measured $I_L$ will have distortions since the "measured" chirp is twice the actual chirp and this is taken into account in a frequency estimation. (See supplementary information).

Clearly, with heterodyne detection there are aliasing issues (i.e. reflections at the Nyquist frequency) for spectra near $f=f_{opt}+q(2\Delta T)^{-1}$, which is circumvented by also calculating the Fourier transform of the product of $V_1$ and $V_{2S}$, the samples from the shifted comb 2, which is shown below to yield $I_{comb}(f_{opt}+(4\Delta T)^{-1} \pm nf_{r2}+q\Delta T^{-1})I_L(f_{opt}+(4\Delta T)^{-1} \pm nf_{r2}+q\Delta T^{-1})$ assuming a shift of $1.25f_{r2}$; together the two measured wideband spectra remove the aliasing problems and allow assignment of the absolute frequency, on each measurement, to within $(\Delta T)^{-1}$, regardless of the central carrier frequency. Similarly, the single heterodyne signals are combined to expand the ambiguity of the high-resolution measurement to $f_{r2}$ rather than $f_{r2}/2$.

The choice of parameters is flexible. We use $f_{r1} \approx f_{r2} \approx f_r = 100$ MHz and $\Delta f_r = 3.1$ kHz and 34 kHz for FIGS. 10 and 11A respectively, with $T_W \equiv \Delta f_r^{-1} = 320$ μs and 30 μs and $(2\Delta T)^{-1} = f_{r1}f_{r2}/(2\Delta f_r) \approx 1.6$ THz and 0.15 THz, respectively. Note the tradeoff from $T_W \equiv \Delta f_r^{-1} \approx f_r^{-2} \Delta T^{-1}$; finer time resolution, $T_W$, implies a more restrictive ambiguity, $\Delta T^{-1}$, and therefore requires better a priori knowledge of the laser frequency. The comb bandwidths are ~50 nm to match the CW laser tuning range. The processing needs four Fourier transforms of $f_r/\Delta f_r \sim 2^{15}$-point records, which requires ~10 ms on a pc and is done in post-processing. However, field programmable gate arrays could provide real time output.

The two passively mode-locked fiber lasers (comb sources) are not self-referenced to avoid the complexity of amplification and continuum generation. The CW reference lasers are, in our case, stabilized to a high-finesse cavity and calibrated against a self-referenced frequency comb to ~1 kHz absolute uncertainty. This accuracy carries over to the spectrometer by simultaneous measuring a 1550 nm laser against a self-referenced frequency comb. Such high accuracy matches the resolution and may be required for some very high precision ranging or spectroscopy applications. However, for many coherent LIDAR systems, kHz linewidths at much lower accuracy are adequate and for Doppler-limited spectroscopy ~MHz accuracy and linewidths are sufficient. Therefore, the high-finesse cavity could be replaced by a simpler cavity or molecular reference line.

FIGS. 10A-10E illustrates a dual-comb spectrometer measurements of a tunable external cavity diode laser (ECDL) swept nonlinearly over a 28 nm span. Unlike approaches with a reference etalon, the output is not continuously tracked; each 320 μs measurement is independent of the previous measurements. To obtain the instantaneous frequency in FIG. 10D, we fit the instantaneous phase, $\theta_L(t_2)-\delta\phi_2(t_2)$, with a $10^{th}$-order polynomial to smooth over the ~0.5 rad per point comb phase noise, and calculate its derivative. As a consequence of limiting our pulse energies to ~pJ to avoid detector saturation, the comb tooth power is ~2 nW and the high-resolution spectra's SNR has a shot-noise limit of ~66 dB. Our SNR is ~6 dB lower due to added detector noise.

FIG. 11A demonstrates frequency metrology of a mechanically perturbed laser at a time resolution of $T_W=30$ μs.

The coherent dual-comb spectrometer disclosed herein provides for time-resolved measurements of dynamic, arbitrary, CW optical waveforms at ~320 μs and ~30 μs time resolution covering a dynamic range in frequency of $>10^9$ (the ratio of the 42 nm bandwidth to 3 kHz resolution). The spectrometer can be optimized for time-resolution, optical bandwidth, or precision to match a given application. This technique allows for metrology of dynamic CW lasers and, more generally, circumvents the sensitivity limits of direct comb spectroscopy by combining the precision and accuracy of combs with the high sensitivity and simple detection topology of conventional CW laser sensing.

It should be understood that the operation of the spectrometer can be described in the frequency domain or time domain (see FIGS. 9E-9F and 9A-9C), where it is similar to a linear optical sampling system or Fourier spectroscopy. The operation thereof will first be explained in more detail from a time-domain perspective with a particular emphasis on the wideband spectrum and frequency estimation, and second from a frequency-domain perspective with a particular emphasis on the consequences of heterodyne detection and bookkeeping for the absolute frequency scaling.

In a time-domain picture, the pulse train of comb 1 or 2 is $$E_{comb1,2} = e^{i\phi_{1,2}} \sum_m e^{im\theta_{1,2}} E_{1,2}(t-mT_{1,2}), \quad (0.1)$$

where the index 1 or 2 indicates the comb number, $\theta_{1,2}$ is the carrier envelope offset (ceo) phase shift, $E_{1,2}(t)$ is the field of a single pulse, $\phi_{1,2}$ is an arbitrary phase offset, m is the pulse number, and $T_{1,2}=f_{r1,2}^{-1}$ is the repetition period. The difference in pulse periods is $\Delta T = T_1-T_2$, (assumed to be positive). For an input E-field $E_L(t)$, the digitized overlap with the $m^{th}$ pulse from comb 1 as a function of sample time $t_1=mT_1$ is $$V_1(t_1) = a \int E_L(t) e^{-i\phi_1} e^{-it_1 f_{r1}\theta_1} E_1^*(t-t_1) dt, \quad (0.2)$$

with an analogous equation for comb 2, assuming a detector bandwidth matched to Nyquist and, for now, IQ detection (so that the complex voltage can be constructed from the sum of the I and Q channels), where a is a constant that converts to ADC counts. We choose the pulse indices such that the pulses from comb 1 and 2 overlap for the same pulse index, m=0. With our phase-locking conditions (see Methods) pulses from the two combs will resynchronize every N comb 1 pulses (which set the digitization clock). We define a single frame as m=0 to N−1, which takes a time $\Delta f_r^{-1} = T_W$, and process on a frame-by-frame basis so that $T_W$ sets the time resolution.

Assuming the pulse spectrum varies slowly compared to the laser spectrum, $V_1(t_1)=ae^{-i\phi_1}e^{-it_1\theta_1 f_{r1}}\tilde{E}_1^*(f_L)E_L(t_1)$ where the tilde represents a Fourier transform. Substituting $E_L(t) \equiv E_L \exp[i\theta_L(t)]$ results in $$V_1(t_1) = aE_L \exp(i[\theta_L(t_1) - \phi_1 - \theta_1 t_1 f_{r1}]) \quad (0.3)$$

with a corresponding beat frequency of $f_1(t_1)=\dot{\theta}_L(t_1)/(2\pi)-nf_{r1}-f_{ceo}$ where the ceo frequency is $f_{ceo,1}=(2\pi)^{-1}\theta_1 f_{r1}$.

Returning to Eq. (0.2), and its analog for comb 2, and writing the product $V_1(m)V_2^*(m)$ as a function of sample number, m, we find $$V_1(m)V_2^*(m) = a^2 \iint \tilde{E}_L(f)\tilde{E}_L^*(f')\tilde{E}_1^*(f)\tilde{E}_2(f')e^{i2\pi m \Delta T f_{opt}} e^{-i2\pi m (fT_1 - f'T_2)} df df', \quad (0.4)$$

(after taking the Fourier transform of each electric field) where the effective offset frequency $f_{opt} \equiv (\theta_2 - \theta_1)(2\pi \Delta T)^{-1}$ modulo the ambiguity $(\Delta T)^{-1}$ corresponds to the frequency of the tooth of combs 1 and 2 locked to the CW reference laser at 1560 nm (or 1535 nm) for our locking conditions.

To proceed further, we need an expression for $\tilde{E}_L^*(f)\tilde{E}_L(f')$. For a static laser $\tilde{E}_L^*(f)\tilde{E}_L(f') = I_L(f)\delta(f-f')$, where $I_L(f)$ is the laser intensity spectrum. The same expression holds true for multiple, uncorrelated CW lasers. An incoherent source will also satisfy this relationship, $\langle \tilde{E}_{incoherent}^*(f)\tilde{E}_{incoherent}(f')\rangle = I_{incoherent}(f)\delta(f-f')$, after averaging as indicated by the bracket. With this condition, and furthermore assuming the combs have similar spectral filtering and negligible differential chirp (by roughly matched fiber lengths) so that $\tilde{E}_1(f)\tilde{E}_2^*(f) \equiv I_{comb}(f)$ the discrete Fourier Transform (DFT) of $V_1(m)V_2^*(m)$ over a single frame is $$V_1V_2^*(n) = a^2 I_{comb}(f_{opt} + nf_{r2} + q\Delta T^{-1}) I_L(f_{opt} + nf_{r2} + q\Delta T^{-1}) \quad (0.5)$$

where n is a frequency index and runs from 0 to N−1 and q is an integer. (With our phase locking conditions, $Nf_{r2} = \Delta T^{-1}$). The above would be true if we had full IQ detection; instead we have heterodyne detection and Eq. (0.5) is modified to equal $V_1V_2^*(n) = a^2 I_{comb}(f_{opt} \pm nf_{r2} + q\Delta T^{-1}) I_L(f_{opt} \pm nf_{r2} + q\Delta T^{-1})$ with n running from 0 to N/2. The DFT of $V_1(m)V_{2S}^*(m)$, where $V_{2S}(m)$ are the samples generated from the shifted comb 2, is $V_1V_{2S}^*(n) = a^2 I_{comb}(f_{opt} + (4\Delta T)^{-1} \pm nf_{r2} + q\Delta T^{-1}) I_L(f_{opt} + (4\Delta T)^{-1} \pm nf_{r2} + q\Delta T^{-1})$ since a frequency shift of $1.25f_{r2}$ of comb 2 effectively increases $f_{opt}$ by $(4\Delta T)^{-1}$.

The expression $\tilde{E}_L(f)\tilde{E}_L(f') \approx I_L(f)\delta(f-f')$ is not true for a frequency-modulated CW laser and spurious tones will appear in the calculated intensity spectrum similarly to conventional Fourier spectroscopy. The spurious tones are suppressed with averaging of multiple data frames, provided the frame rate is not phase coherent with the modulation. More relevant, the above expression is also not true for a strongly swept CW laser, i.e. one that changes by $>f_r$ over the interval $T_W$. We discuss this effect and its consequences next.

With the assumption that $T_W$ is reasonably short, we approximate any laser frequency change as linear, so that $$\theta_L(t) = \theta_0 + 2\pi f_{L0} t + \pi C t^2 \quad (0.6)$$

in terms of a linear chirp C and starting laser frequency $f_{L0}$. The laser frequency is $f_L(t) = \dot{\theta}_L(t)/(2\pi) = f_{L0} + Ct$ so that it covers a bandwidth $CT_W$ over the interval $T_W$. From Eq. (0.3) and assuming zero ceo phase as in the main text and zero carrier phase noise, the product $V_1(t_1)V_2^*(t_2) \propto |E_L|^2 \exp[i(\theta_L(t_1) - \theta_L(t_2))] = |E_L|^2 \exp[i(2\pi f_{L0}\Delta t + \pi C(t_1^2 - t_2^2))]$, where $\Delta t = t_1 - t_2$. We can rewrite this equation as $V_1(t_1)V_2^*(t_2) \propto |E_L|^2 \exp(i\theta'_L(\Delta t))$, where the phase factor is $\theta'_L(\Delta t) \approx 2\pi f_{L0}\Delta t + 2\pi NC\Delta t^2$ and $N = t_2/\Delta t = T_2/\Delta T = f_{r1}/\Delta f_r$ is the down-sampling factor (see Methods). Substituting $\Delta t \to t$ and $NC \to C$ to account for the down-sampled time, the phase $\theta'_L(\Delta t)$ equals Eq. (0.6), except that there is an additional factor of 2 in the last term describing the chirp. Therefore, the calculated wideband spectrum (i.e. spectrum of $V_1(t_1)V_2^*(t_2)$) over a frame of length $T_W$ will have a width $\sim 2CT_W$, twice as wide as it should be. More significantly this increased width all occurs at positive frequencies (for an increasing chirp) which leads to a bias in the calculated mean frequency equal to $CT_W/2$. We have verified this effect by plotting the calculated wideband spectrum for a continuously swept laser; we find an overlap of consecutive wideband spectra and a spectral width roughly twice the expected value given the chirp rate.

For chirp rates $C < f_r/T_W$, the shift is less than half the wideband spectrum resolution of $f_r$, and can be ignored. However, if a chirp $C > f_r/T_W$, we correct the estimated frequency by $CT_W/2$, where we calculate the chirp C directly from the individual frequencies $f_{1,2}$.

For most situations, this corrected mean frequency is more than adequate. However, it would, in principle, be possible to track the instantaneous frequency over all time even for high chirp without correction by simply successively switch between $f_1$, $f_2$, and $f_{2S}$ as the laser frequency crosses successive comb teeth of comb 1, 2 and the shifted 2.

The operation can also be described in the Frequency domain. We are interested here in the frequency assignment of the high-resolution spectrum. In the frequency comb description, comb 1 is $\tilde{E}_{comb,1}(t) = \Sigma_n |\tilde{E}_1(f_{1n})| e^{-i(2\pi f_{1n} t + \phi_{1n})}$ where the nth comb tooth has phase $\phi_{1n}$ and frequency $f_{1n} = f_{opt} + nf_{r1}$ as measured relative to the frequency of a specific, phase-locked tooth at $f_{opt}$ (rather than the ceo frequency). Similarly, the teeth of comb 2, labeled by index n', have frequency $f_{2n'} = f_{opt} + n'f_{r2}$ and phase $\phi_{2n'}$ (with respect to the same common phase-locked tooth at $f_{opt}$ for our phase-locking conditions). The heterodyne signal between the laser and the nearest tooth of combs 1 and 2, digitized synchronous with comb 1 (i.e. at a rate $f_{r1}$), is $$V_1(t) = \sqrt{2}a|\tilde{E}_1(f_{1n})||E_L(t)|\cos(\pm 2\pi f_1 t)$$

$$V_2(t) = \sqrt{2}a|\tilde{E}_2(f_{2n'})||E_L(t)|\cos(\pm 2\pi (f_2 + zf_{r1})t) \quad (0.7)$$

where the arguments of the cosine function are $2\pi f_1 t = \theta_L(t) - 2\pi f_{1n} t - \phi_{1n}$ and $2\pi f_2 t = \theta_L(t) - 2\pi f_{2n'} t - \phi_{2n'}$ and we have let $t_1 \to t$ to minimize subscripts. As a consequence of the experimental reality that the signal from the second comb is sampled at $t = t_1$ rather than $t_2$, aliasing can take place for $f_2$, which is accounted for by $z \in \{-1, 0, 1\}$, as needed to force $|f_2 + zf_{r1}| \leq f_{r1}/2$.

Without IQ detection, the corresponding "sine" component is unavailable and the product $V_1(t)V_2(t)$ has both a difference and sum frequency term. Substitution of $f_1$, $f_2$ and $n = n' - z$ (i.e. assuming the common lock point $f_{opt}$ is near $f_L$), the difference frequency term is $[V_1(t)V_2(t)]_{diff} = a^2 I_{comb}(f_{2n}) I_L(f_L) \cos[2\pi n \Delta f_r t - \Delta \phi_{12}]$ where $\Delta \phi_{12} = \phi_{1n} - \phi_{2n}$ and letting $n' \to n$. In other words, the amplitude at the rf frequency $n\Delta f_r$ is proportional to the input intensity at $f_{1n} \approx f_{2n}$, or more generally, the intensity within the spectral band $f_{2n} \pm f_{r2}/2$ closest to the $n^{th}$ tooth of comb 2. When scaled up in frequency by the down-sampling factor N, the rf spectrum is the wideband intensity spectrum. (This scaling is automatic if we rescale the spacing between time points to $\Delta T$ before the Fourier transform.) A similar signal is generated using comb 1 and the shifted comb 2, after shifting the comb 2 teeth by $f_{2n} \to f_{2n} + f_{r2}4$. Note that residual phase noise between the combs associated with $\Delta \phi_{12}$ must be minimized to avoid broadening of the difference frequency signal beyond $\Delta f_r$, with a corresponding loss of resolution.

The sum frequency gives a very different, and undesired, result of $[V_1(t)V_2(t)]_{sum} = a^2 I_{comb}(f_{2n}) I_L(f_L) \cos[2\theta_L(t) - 4\pi f_{opt} t - 4\pi n f_{r2} t - \phi_{1n} - \phi_{2n}]$, which depends strongly on the relative phase between the input laser and comb (and therefore reference laser). For differential phase noise 1rad (i.e. for our narrow comb lines a laser linewidth greater than the time-bandwidth product) this sum frequency signal will be broad and easily distinguishable from the difference frequency signal, which we can then use to assign an absolute frequency to the high-resolution spectrum. If the instantaneous laser linewidth is below $f_r/2$, a Hilbert transform can also be applied to eliminate the undesired sum frequency contribution. For an instantaneous laser linewidth greater than $f_r/4$, the sum frequency signal is so broad as to be distributed evenly from 0 to $f_r/2$ and effectively becomes the limiting noise source. Note that for very short update intervals, it might be that $\theta_L(t)-2\pi f_L t$ does not vary more than ~1 rad and the sum-frequency signal would be narrow and therefore indistinguishable from the difference-frequency signal (although that case was never met here even for a DFB fiber laser at $T_W$=300 µs). In that case, a common-mode phase modulation can be applied to the combs to purposefully broaden the sum frequency, while maintaining negligible residual phase noise between the combs (i.e. $\Delta\phi_{12}$=0).

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A method of comb-based spectroscopy comprising:
   generating a first comb that transmits a first pulse train that is optically combined with a continuous-wave source (CW source);
   detecting a first overlap of each pulse of the first comb with the CW source in a first photodetector;
   digitizing a photodetector response from the first photodetector for each pulse of the first pulse train to generate digitized samples of the CW source measured from the first comb;
   generating a second comb that is optically coherent with the first comb and separately combined with the CW source, said second comb transmits a second pulse train that has a pulse period that differs by a change in time from the first pulse train and a pulse repetition frequency that differs by a change in a repetition rate from the first pulse train, wherein $\Delta T$ represents the change in time, fr represents the repetition rate, and $\Delta fr$ represents the change in repetition rate;
   detecting a second overlap of each pulse of the second comb with the CW source in a second photodetector;
   digitizing a photodetector response from the second photodetector for each pulse of the second pulse train to generate digitized samples of the CW source measured from the second comb;
   multiplying the digitized samples from the first overlap by the digitized samples of the second overlap to produce a product data point record, wherein a length of the product data point record is fr/$\Delta fr$ points over a duration in time of 1/$\Delta fr$;
   modifying a point separation for the product data point record to be the $\Delta T$;
   Fourier transforming the product data point record to yield a wideband spectrum of the CW source at a resolution given by the repetition rate fr to provide an absolute frequency of the CW source with respect to a CW reference laser to which the first comb and the second comb are locked; and
   at least one of:
      directing at least a portion of the CW source through a apectroscopy sample to generate a resulting transmission signal to obtain spectroscopic information about the spectroscopy sample, or
      directing at least a portion of the CW source into a laser ranging and detection (LADAR) system to generate a LADAR signal representing a range to a target.

2. The method as recited in claim 1, further comprising:
   generating a third comb by splitting the second comb into two parts and frequency-shifting one of the two parts to create the third comb with the repetition rate fr but at an offset frequency shift equal to a fraction of the repetition rate fr, wherein the fraction is represented by X;
   detecting a third overlap of each pulse of the third comb with the CW source in a third photodetector to generate digitized samples of the CW source measured from the third comb;
   processing the digitized samples of the CW source measured from the third comb and the digitized samples of the CW source measured from the first comb to yield another wideband spectrum of the CW source at a resolution given by the repetition rate fr but at an offset frequency that differs from the wideband spectrum of the product data point record of the first comb and the second comb, wherein the offset frequency is X/$\Delta T$; and
   combining the wideband spectrum from the first comb and the third comb with the wideband spectrim from the first comb and the second comb to provide an absolute frequency of the CW source with respect to the CW reference laser to which the first comb and the second are locked with an overall ambiguity represented by 1/($\Delta T$).

3. The method as recited in claim 2, further comprising:
   individually Fourier transforming the digitized samples of the CW source measured from the first comb, the digitized samples of the CW source measured from second comb, or the digitized samples of the CW source measured from third comb to generate a spectrum of the CW source with time-bandwidth limited resolution.

4. The method as recited in claim 3, further comprising:
   differentiation of either the digitized samples of the CW source measured from first comb or the digitized samples of the CW source measured from second comb versus time to generate an estimate of an instantaneous frequency versus time of the CW source, modulo the repetition rate fr, and generating a continuous measurement of the instantaneous frequency versus time of the CW source.

5. The method as recited in claim 4, further comprising:
   directing at least a portion of the CW source through the spectroscopy sample, digitizing the resulting transmission signal, and plotting the digitized resulting transmission signal against the instantaneous frequency to generate a frequency-calibrated transmission spectrum for the spectroscopy sample.

6. The method as recited in claim 4, further comprising: directing at least a portion of the CW source into the LADAR system, digitizing the LADAR signal versus time, interpolating the digitized LADAR signal against the instantaneous frequency of the CW source to generate an interpolated digitized LADAR signal that has evenly spaced CW frequency steps, and Fourier transforming the interpolated digitized LADAR signal to yield the range to the target.

* * * * *

UNITED STATES PATENT AND TRADEMARK OFFICE
CERTIFICATE OF CORRECTION

| | |
|---|---|
| PATENT NO. | : 9,557,219 B2 |
| APPLICATION NO. | : 14/012436 |
| DATED | : January 31, 2017 |
| INVENTOR(S) | : Nathan R. Newbury, Ian Coddington and William S. Swann |

It is certified that error appears in the above-identified patent and that said Letters Patent is hereby corrected as shown below:

On the Title Page

Item (71), Applicant, Column 1, Line 7; correct applicant location --Gaithersburg, MD (US)--

In the Specification

IN THE DETAILED DESCRIPTION:

Column 16, Line 51; before "which" replace "Lindar" with --LIDAR--

In the Claims

In Claim 1, Column 24, Line 14; before "sample" replace "apectroscopy" with --spectroscopy--

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*